(12) United States Patent
Zhou et al.

(10) Patent No.: US 12,207,128 B2
(45) Date of Patent: Jan. 21, 2025

(54) REPORTING INFORMATION SENDING METHOD, APPARATUS, AND SYSTEM

(71) Applicant: Huawei Technologies Co., Ltd., Shenzhen (CN)

(72) Inventors: Xiaoyun Zhou, Nanjing (CN); Zaifeng Zong, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 348 days.

(21) Appl. No.: 17/857,866

(22) Filed: Jul. 5, 2022

(65) Prior Publication Data

US 2022/0345932 A1    Oct. 27, 2022

Related U.S. Application Data

(63) Continuation of application No. PCT/CN2021/070521, filed on Jan. 6, 2021.

(30) Foreign Application Priority Data

Jan. 6, 2020    (CN) .......................... 202010011703.X

(51) Int. Cl.
H04W 28/02    (2009.01)
(52) U.S. Cl.
CPC ... H04W 28/0268 (2013.01); H04W 28/0247 (2013.01)
(58) Field of Classification Search
None
See application file for complete search history.

(56) References Cited

U.S. PATENT DOCUMENTS 10,588,052 B1 * 3/2020 Srivastava ............ H04W 76/10
11,304,085 B2    4/2022 Ding et al.
(Continued)

FOREIGN PATENT DOCUMENTS

CN    103037449 A    4/2013
CN    109981488 A    7/2019
(Continued)

OTHER PUBLICATIONS

"3rd Generation Partnership Project; Technical Specification Group Services and System Aspects; System Architecture for the 5G System; Stage 2 (Release 15)," 3GPP TS 23.501 V15.6.0, Jun. 2019, 243 pages.
(Continued)

Primary Examiner — Anh Ngoc M Nguyen
(74) Attorney, Agent, or Firm — Slater Matsil, LLP

(57) ABSTRACT

Embodiments of this application provide a reporting information sending method, an apparatus, and a system. The method includes: A user plane network element receives, from a first access network element, a first message including an identifier of a first quality of service flow QoS flow and first indication information, where the first indication information is used to indicate whether a quality of service QoS requirement of the first QoS flow can be satisfied; and sends first reporting information including second indication information to an application function network element based on the first message, where the second indication information is used to indicate whether a QoS requirement of a service data flow of an application can be satisfied, and the first QoS flow is used to transmit the service data flow of the application corresponding to the application function network element.

19 Claims, 10 Drawing Sheets

(56) References Cited

U.S. PATENT DOCUMENTS

| | | | |
|---|---|---|---|
| 11,546,269 | B2 | 1/2023 | Liu et al. |
| 11,575,754 | B2 | 2/2023 | Sun et al. |
| 11,576,083 | B2 | 2/2023 | Wu et al. |
| 2019/0253917 | A1 | 8/2019 | Dao |
| 2021/0243640 | A1* | 8/2021 | Hoffmann ......... H04W 28/0268 |

FOREIGN PATENT DOCUMENTS

| | | |
|---|---|---|
| CN | 110035018 A | 7/2019 |
| CN | 110519807 A | 11/2019 |
| WO | 2018126692 A1 | 7/2018 |
| WO | 2019141166 A1 | 7/2019 |
| WO | 2019223690 A1 | 11/2019 |

OTHER PUBLICATIONS

"Control of QoS parameters for default QoS Flow," Source to WG: Huawei, HiSilicon, Source to TSG: SA2, Work item code: 5GS_Ph1, Date: Oct. 16, 2018, Category: F, Release: Rel-15, SA WG2 Temporary Document, 3GPP TSG-SA WG2 Meeting #129, S2-1811265, Dongguan, China, Oct. 15-20, 2018, 13 pages.

"QoS Notification Control," Source to WG: Tencent, Source to TSG: SA2, Work Item Code: 5GS_Phase1, Category: A, Release: Rel-16, Date: Apr. 2, 2019, Change Request, 23.501 CR 1044, rev—Current Version: 16.0.2, SA WG2 Meeting #132, S2-1903088 (Revision of S2-19xxxx), Xi'an, China, Apr. 8-12, 2019, 3 pages.

* cited by examiner

REPORTING INFORMATION SENDING METHOD, APPARATUS, AND SYSTEM

CROSS-REFERENCE TO RELATED APPLICATIONS

This application is a continuation of International Application No. PCT/CN2021/070521, filed on Jan. 6, 2021, which claims priority to Chinese Patent Application No. 202010011703.X, filed on Jan. 6, 2020. The disclosures of the aforementioned applications are hereby incorporated by reference in their entireties.

TECHNICAL FIELD

The present invention relates to the field of communication technologies, and in particular, to a reporting information sending method, a device, and a system.

BACKGROUND

After accessing a fifth generation (5G) communication network, user equipment establishes a protocol data unit (PDU) session, accesses a data network (DN) by using the PDU session, and interacts with an application server, for example, an application function (AF) network element, deployed in the DN. For example, the PDU session includes a plurality of quality of service flows (QoS flows). Service data flows corresponding to different applications are transmitted by using different QoS flows. In a process in which the user equipment interacts with the AF network element by using a QoS flow, the AF network element needs to sense whether quality of service provided by a QoS flow used to transmit a service data flow of an application can satisfy a quality of service (QoS) requirement of the application. In this way, the AF network element performs a corresponding adjustment measure based on the quality of service of the QoS flow, so that an adjusted QoS flow satisfies the QoS requirement of the application.

In a conventional technology, the AF network element obtains, in the following manner, whether a QoS flow can satisfy the QoS requirement of the application: The AF network element sends a subscription request to a network exposure function (NEF) network element, where the subscription request includes QoS control notification information. The NEF network element sends the subscription request to a policy control function (PCF) network element. The PCF network element formulates a corresponding policy and charging control (PCC) rule based on the QoS control notification information, and sends the PCC rule to a session management function (SMF) network element. The SMF network element generates a PDU session according to the PCC rule, configures a corresponding QoS flow for the application, and sends QoS notification control information corresponding to the QoS flow to an access network element through an access and mobility management function (AMF) network element. The access network element detects the QoS flow based on the QoS notification control information. When determining that a current bit rate of the QoS flow is less than a guaranteed bit rate (GBR), the access network element determines that the QoS flow cannot satisfy the QoS requirement of the application. The access network element sends, to the SMF network element through the AMF network element, indication information indicating that the QoS flow cannot satisfy the QoS requirement of the application. The SMF network element further reports the indication information to the AF network element through the PCF network element and the NEF network element.

It can be learned from the foregoing that the indication information generated by the access network element is reported to the AF network element sequentially through the AMF network element, the SMF network element, the PCF network element, and the NEF network element. Because the indication information generated by the access network element is reported to the AF network element through a plurality of core network elements, a reporting path is long, timeliness of reporting the indication information is reduced, and it is unfavorable for the AF network element to adjust the service data flow of the application in a timely manner based on the indication information. For an application with high time sensitivity, a QoS requirement of the application cannot be satisfied in a timely manner.

SUMMARY

In view of this, an objective of the present invention is to provide a reporting information sending method, an apparatus, and a system, to resolve technical problems in a conventional technology that because a path used by an access network element to report indication information used to indicate whether a QoS requirement of a QoS flow can be satisfied is long, timeliness is poor, it is unfavorable for an application function network element to adjust a service data flow of an application in a timely manner, and a QoS requirement of the application cannot be satisfied.

According to a first aspect, a reporting information sending method is provided. The method includes: A user plane network element receives, from a first access network element, a first message including an identifier of a first quality of service flow QoS flow used to transmit a service data flow of an application and first indication information, where the first indication information is used to indicate whether a quality of service QoS requirement of the first QoS flow can be satisfied; and the user plane network element sends, to an application function network element based on the first message, first reporting information including second indication information, where the second indication information is used to indicate whether a QoS requirement of the service data flow of the application can be satisfied.

According to the method in the first aspect, in this embodiment of this application, the user plane network element receives the first indication information sent by the access network element and processes the first indication information, to obtain the second indication information, and reports the second indication information to the application function network element. In comparison with an existing case in which an access network element reports indication information to an application function network element in a local data center sequentially through an access and mobility management network element, a session management network element, a policy control network element, and a network exposure network element in a central data center, a reporting path can be shortened, and timeliness of reporting the indication information can be improved, so that the application function network element adjusts the service data flow of the application in a timely manner based on the indication information. For an application with high time sensitivity, a QoS requirement of the application can be satisfied in a timely manner.

In a possible design, with reference to the first aspect, if the first indication information is used to indicate that the QoS requirement of the first QoS flow cannot be satisfied, the second indication information is used to indicate that the QoS requirement of the service data flow of the application cannot be satisfied; or if the first indication information is used to indicate that the QoS requirement of the first QoS flow is satisfied, the second indication information is used to indicate that the QoS requirement of the service data flow of the application is satisfied.

Based on this possible design, the user plane network element converts the first indication information corresponding to the first QoS flow into the second indication information corresponding to the service data flow of the application, so that the application function network element determines, based on the second indication information, whether the QoS requirement of the service data flow of the application can be satisfied.

In a possible design, with reference to the first aspect or the possible design of the first aspect, when the second indication information indicates that the QoS requirement of the service data flow of the application cannot be satisfied, after that the user plane network element sends first reporting information to an application function network element, the method further includes: The user plane network element receives, from a second access network element or a session management network element, an identifier list that is of QoS flows accepted by the second access network element and that includes the identifier of the first QoS flow; and the user plane network element sends, to the application function network element, second reporting information including third indication information, where the third indication information is used to indicate that the QoS requirement of the service data flow of the application can be satisfied.

Based on this possible design, when the user plane network element receives the identifier list of the QoS flows accepted by the second access network element, if the user plane network element has sent the first reporting information to the application function network element, and the first reporting information includes the second indication information used to indicate that the QoS requirement of the service data flow of the application cannot be satisfied, the user plane network element determines whether the first QoS flow corresponding to the service data flow of the application in the first reporting information is in the identifier list. If yes, it indicates that the QoS requirement of the first QoS flow can be satisfied after user equipment moves from the first access network element to the second access network element. In this case, the user plane network element sends, to the application function network element, the third indication information indicating that the QoS requirement of the service data flow of the application corresponding to the first QoS flow can be satisfied, so that the application function network element can adjust the service data flow of the application based on the third indication information, to better satisfy a QoS requirement of the application.

In a possible design, with reference to the first aspect or the possible design of the first aspect, when the second indication information indicates that the QoS requirement of the service data flow of the application cannot be satisfied, after that the user plane network element sends first reporting information to an application function network element, the method further includes: The user plane network element receives fourth indication information from a second access network element or a session management network element, where the fourth indication information is used to indicate that the QoS requirement of the first QoS flow can be satisfied; and the user plane network element sends second reporting information to the application function network element, where the second reporting information includes third indication information, and the third indication information is used to indicate that the QoS requirement of the service data flow of the application can be satisfied.

Based on this possible design, when receiving the fourth indication information after sending the first reporting information, the user plane network element sends, to the application function network element based on the fourth indication information, the second reporting information including the third indication information, so that the application function network element can learn, in a timely manner based on the second reporting information, that the QoS requirement of the service data flow of the application changes from being unsatisfied to being satisfied, and adjust the service data flow of the application in a timely manner, to better satisfy a QoS requirement of the application.

In a possible design, with reference to the first aspect or the possible designs of the first aspect, that the user plane network element sends first reporting information to an application function network element includes: The user plane network element receives a first policy from the session management network element, where the first policy includes the identifier of the first QoS flow and information about a notification endpoint that is of the application function network element and that corresponds to the identifier of the first QoS flow; and the user plane network element sends the first reporting information to the application function network element through the notification endpoint of the application function network element according to the first policy.

In a possible design, with reference to the first aspect or the possible designs of the first aspect, that the user plane network element sends second reporting information to the application function network element includes: The user plane network element receives a first policy from the session management network element, where the first policy includes the identifier of the first QoS flow and information about a notification endpoint that is of the application function network element and that corresponds to the identifier of the first QoS flow; and the user plane network element sends the second reporting information to the application function network element through the notification endpoint of the application function network element according to the first policy.

Based on the foregoing two possible designs, the user plane network element receives the identifier of the first QoS flow and the information about the notification endpoint corresponding to the identifier of the first QoS flow in the first policy, so that the user plane network element sends, to the application function network element through the notification endpoint corresponding to the first QoS flow, the first reporting information or the second reporting information indicating whether the QoS requirement of the service data flow of the application corresponding to the first QoS flow can be satisfied. This provides a feasible solution for the user plane network element to report, to the application function network element, whether the QoS requirement of the service data flow of the application can be satisfied.

In a possible design, with reference to the first aspect or the possible designs of the first aspect, before that the user plane network element sends first reporting information to an application function network element, the method further includes: The user plane network element receives fifth indication information from the session management network element, where the fifth indication information is used to indicate the user plane network element to send the first reporting information to the application function network element; and that the user plane network element sends first reporting information to an application function network element includes: The user plane network element further sends the first reporting information to the application function network element based on the fifth indication information.

In a possible design, with reference to the first aspect or the possible designs of the first aspect, before that the user plane network element sends second reporting information to the application function network element, the method further includes: The user plane network element receives fifth indication information from the session management network element, where the fifth indication information is used to indicate the user plane network element to send the second reporting information to the application function network element; and that the user plane network element sends second reporting information to the application function network element includes: The user plane network element further sends the second reporting information to the application function network element based on the fifth indication information.

Based on the foregoing two possible designs, after receiving the fifth indication information sent by the session management network element, the user plane network element may clearly learn, based on the explicit fifth indication information, that the first reporting information or the second reporting information needs to be sent to the application function network element.

In a possible design, with reference to the first aspect or the possible designs of the first aspect, that the user plane network element sends first reporting information to an application function network element further includes: The user plane network element sends the first reporting information to the application function network element through a local network exposure network element.

In a possible design, with reference to the first aspect or the possible designs of the first aspect, that the user plane network element sends second reporting information to the application function network element further includes: The user plane network element sends the second reporting information to the application function network element through a local network exposure network element.

Based on the foregoing two possible designs, when sending the first reporting information or the second reporting information to the application function network element, the user plane network element may directly send the first reporting information or the second reporting information to the application function network element, or may send the first reporting information or the second reporting information to the application function network element through the local network exposure network element. This is not limited.

In a possible design, with reference to the first aspect or the possible designs of the first aspect, that the user plane network element sends the first reporting information to the application function network element through a local network exposure network element includes: The user plane network element receives a second policy from the session management network element, where the second policy includes the identifier of the first QoS flow and information about a notification endpoint that is of the local network exposure network element and that corresponds to the identifier of the first QoS flow; the user plane network element sends, according to the second policy, the first reporting information to the local network exposure network element through the notification endpoint of the local network exposure network element; the local network exposure network element determines the notification endpoint of the application function network element based on the notification endpoint of the local network exposure network element; and the local network exposure network element sends the first reporting information to the application function network element by using the information about the notification endpoint of the application function network element.

In a possible design, with reference to the first aspect or the possible designs of the first aspect, that the user plane network element sends the second reporting information to the application function network element through a local network exposure network element includes: The user plane network element receives a second policy from the session management network element, where the second policy includes the identifier of the first QoS flow and information about a notification endpoint that is of the local network exposure network element and that corresponds to the identifier of the first QoS flow; the user plane network element sends, according to the second policy, the second reporting information to the local network exposure network element through the notification endpoint of the local network exposure network element; the local network exposure network element determines the notification endpoint of the application function network element based on the notification endpoint of the local network exposure network element; and the local network exposure network element sends the second reporting information to the application function network element by using the information about the notification endpoint of the application function network element.

Based on the foregoing two possible designs, when sending the first reporting information or the second reporting information to the application function network element through the local network exposure network element, the user plane network element may send the first reporting information or the second reporting information to the local network exposure network element through the notification endpoint of the local network exposure network element, and then the local network exposure network element sends the first reporting information or the second reporting information to the application function network element by using the information about the notification endpoint of the application function network element. This provides a feasible solution for the user plane network element to send the first reporting information or the second reporting information to the application function network element through the local network exposure network element.

In a possible design, with reference to the first aspect or the possible designs of the first aspect, that the user plane network element sends first reporting information to an application function network element further includes: The user plane network element sends the first reporting information to the application function network element through the session management network element.

In a possible design, with reference to the first aspect or the possible designs of the first aspect, that the user plane network element sends second reporting information to the application function network element further includes: The user plane network element sends the second reporting information to the application function network element through the session management network element.

Based on the foregoing two possible designs, when sending the first reporting information or the second reporting information to the application function network element, the user plane network element may directly send the first reporting information or the second reporting information to the application function network element, or may send the first reporting information or the second reporting information to the application function network element through the session management network element. This is not limited.

In a possible design, with reference to the first aspect or the possible designs of the first aspect, that the user plane network element sends the first reporting information to the application function network element through the session management network element includes: The user plane network element receives a fourth policy from the session management network element, where the fourth policy includes the identifier of the first QoS flow and a notification endpoint allocated by the session management network element; the user plane network element sends the first reporting information to the session management network element according to the fourth policy; and the session management network determines the notification endpoint of the application function network element or the notification endpoint of the local network exposure network element based on the allocated notification endpoint, and the session management network element sends the first reporting information to the application function network element or sends the first reporting information to the application function network element through the local network exposure network element.

In a possible design, with reference to the first aspect or the possible designs of the first aspect, that the user plane network element sends the second reporting information to the application function network element through the session management network element includes: The user plane network element receives a fourth policy from the session management network element, where the fourth policy includes the identifier of the first QoS flow and a notification endpoint allocated by the session management network element; the user plane network element sends the second reporting information to the session management network element according to the fourth policy; and the session management network determines the notification endpoint of the application function network element or the notification endpoint of the local network exposure network element based on the notification endpoint allocated by the session management network, and the session management network element sends the second reporting information to the application function network element or sends the second reporting information to the application function network element through the local network exposure network element.

Based on the foregoing two possible designs, the user plane network element sends the first reporting information or the second reporting information to the application function network element through the session management network element, and then the session management network element sends the first reporting information or the second reporting information to the application function network element directly or through the local network exposure network element. This provides a feasible solution for the user plane network element to send the first reporting information or the second reporting information to the application function network element through the session management network element.

In a possible design, with reference to the first aspect or the possible designs of the first aspect, the first reporting information further includes an identifier of the service data flow of the application.

In a possible design, with reference to the first aspect or the possible designs of the first aspect, the second reporting information further includes an identifier of the service data flow of the application.

Based on the foregoing two possible designs, when the first reporting information or the second reporting information includes the identifier of the service data flow of the application, the application function network element may determine, without parsing the first reporting information or the second reporting information, a specific service data flow that is of the application and that corresponds to the currently received first reporting information or second reporting information.

In a possible design, with reference to the first aspect or the possible designs of the first aspect, the user plane network element receives, from the session management network element, the identifier of the first QoS flow and the identifier that is of the service data flow of the application and that corresponds to the identifier of the first QoS flow; and the user plane network element determines the identifier of the service data flow of the application based on the identifier of the first QoS flow.

Based on this possible design, the user plane network element may determine a correspondence between the first QoS flow and the service data flow of the application based on the identifier of the first QoS flow and the identifier that is of the service data flow of the application and that corresponds to the identifier of the first QoS flow that are sent by the session management network element, to convert the indication information corresponding to the first QoS flow into the indication information corresponding to the service data flow of the application, and send the indication information to the application function network element.

In a possible design, with reference to the first aspect or the possible designs of the first aspect, the first message further includes an identifier of a first alternative QoS profile, the first reporting information further includes an identifier of a first alternative service requirement, and the identifier of the first alternative service requirement corresponds to the identifier of the first alternative QoS profile.

Based on this possible design, when the first message includes the identifier of the first alternative QoS profile, the user plane network element may determine a corresponding first alternative service requirement based on the first alternative QoS profile, include the identifier of the first alternative service requirement in the first reporting information, and send the first reporting information to the application function network element, so that the application function network element determines that a QoS requirement of the first alternative service requirement can be satisfied.

In a possible design, with reference to the first aspect or the possible designs of the first aspect, the user plane network element receives an identifier of an alternative service requirement and an identifier that is of an alternative QoS profile and that corresponds to the identifier of the alternative service requirement from the session management network element; and the user plane network element determines the identifier of the first alternative service requirement based on the identifier of the first alternative QoS profile.

Based on this possible design, the user plane network element receives the identifier of the alternative service requirement and the identifier that is of the alternative QoS profile and that corresponds to the identifier of the alternative service requirement that are sent by the session management network element, so that after receiving the first message including the first alternative QoS profile, the user plane network element determines the corresponding first alternative service requirement based on the first alternative QoS profile, and sends the identifier of the first alternative service requirement to the application function network element.

According to a second aspect, a communication apparatus is provided. The communication apparatus may implement a function performed by the user plane network element in the first aspect or the possible design of the first aspect, and the function may be implemented by hardware by executing corresponding software. The hardware or the software includes one or more modules corresponding to the function. For example, the communication apparatus includes a receiving module and a sending module.

The receiving module is configured to receive, from a first access network element, a first message including an identifier of a first quality of service flow QoS flow used to transmit a service data flow of an application and first indication information, where the first indication information is used to indicate whether a quality of service QoS requirement of the first QoS flow can be satisfied.

The sending module is configured to send, to an application function network element based on the first message, first reporting information including second indication information, where the second indication information is used to indicate whether a QoS requirement of the service data flow of the application can be satisfied.

For a specific implementation of the communication apparatus, refer to a behavior function of the user plane network element in the reporting information sending method according to any one of the first aspect or the possible designs of the first aspect. According to the communication apparatus described in the second aspect, the user plane network element receives the first indication information sent by the access network element and processes the first indication information, to obtain the second indication information, and reports the second indication information to the application function network element. In comparison with an existing case in which an access network element reports indication information to an application function network element in a local data center sequentially through an access and mobility management network element, a session management network element, a policy control network element, and a network exposure network element in a central data center, a reporting path can be shortened, and timeliness of reporting the indication information can be improved, so that the application function network element adjusts the service data flow of the application in a timely manner based on the indication information. For an application with high time sensitivity, a QoS requirement of the application can be satisfied in a timely manner.

In a possible design, with reference to the second aspect, if the first indication information is used to indicate that the QoS requirement of the first QoS flow cannot be satisfied, the second indication information is used to indicate that the QoS requirement of the service data flow of the application cannot be satisfied; or if the first indication information is used to indicate that the QoS requirement of the first QoS flow is satisfied, the second indication information is used to indicate that the QoS requirement of the service data flow of the application is satisfied.

Based on this possible design, the user plane network element converts the first indication information corresponding to the first QoS flow into the second indication information corresponding to the service data flow of the application, so that the application function network element determines, based on the second indication information, whether the QoS requirement of the service data flow of the application can be satisfied.

In a possible design, with reference to the second aspect or the possible design of the second aspect, when the second indication information indicates that the QoS requirement of the service data flow of the application cannot be satisfied, after that the user plane network element sends first reporting information to an application function network element, the receiving module is further configured to receive, from a second access network element or a session management network element, an identifier list that is of QoS flows accepted by the second access network element and that includes the identifier of the first QoS flow; and the sending module is further configured to send, to the application function network element, second reporting information including third indication information, where the third indication information is used to indicate that the QoS requirement of the service data flow of the application can be satisfied.

Based on this possible design, when the user plane network element receives the identifier list of the QoS flows accepted by the second access network element, if the user plane network element has sent the first reporting information to the application function network element, and the first reporting information includes the second indication information used to indicate that the QoS requirement of the service data flow of the application cannot be satisfied, the user plane network element determines whether the first QoS flow corresponding to the service data flow of the application in the first reporting information is in the identifier list. If yes, it indicates that the QoS requirement of the first QoS flow can be satisfied after user equipment moves from the first access network element to the second access network element. In this case, the user plane network element sends, to the application function network element, the third indication information indicating that the QoS requirement of the service data flow of the application corresponding to the first QoS flow can be satisfied, so that the application function network element can adjust the service data flow of the application based on the third indication information, to better satisfy a QoS requirement of the application.

In a possible design, with reference to the second aspect or the possible design of the second aspect, when the second indication information indicates that the QoS requirement of the service data flow of the application cannot be satisfied, after that the user plane network element sends first reporting information to an application function network element, the receiving module is further configured to receive fourth indication information from a second access network element or a session management network element, where the fourth indication information is used to indicate that the QoS requirement of the first QoS flow can be satisfied; and the sending module is further configured to send second reporting information to the application function network element, where the second reporting information includes third indication information, and the third indication information is used to indicate that the QoS requirement of the service data flow of the application can be satisfied.

Based on this possible design, when receiving the fourth indication information after sending the first reporting information, the user plane network element sends, to the application function network element based on the fourth indication information, the second reporting information including the third indication information, so that the application function network element can learn, in a timely manner based on the second reporting information, that the QoS requirement of the service data flow of the application changes from being unsatisfied to being satisfied, and adjust the service data flow of the application in a timely manner, to better satisfy a QoS requirement of the application.

In a possible design, with reference to the second aspect or the possible designs of the second aspect, the receiving module is further configured to receive a first policy from the session management network element, where the first policy includes the identifier of the first QoS flow and information about a notification endpoint that is of the application function network element and that corresponds to the identifier of the first QoS flow; and the sending module is further configured to send the first reporting information to the application function network element through the notification endpoint of the application function network element according to the first policy.

In a possible design, with reference to the second aspect or the possible designs of the second aspect, the receiving module is further configured to receive a first policy from the session management network element, where the first policy includes the identifier of the first QoS flow and information about a notification endpoint that is of the application function network element and that corresponds to the identifier of the first QoS flow; and the sending module is further configured to send the second reporting information to the application function network element through the notification endpoint of the application function network element according to the first policy.

Based on the foregoing two possible designs, the user plane network element receives the identifier of the first QoS flow and the information about the notification endpoint corresponding to the identifier of the first QoS flow in the first policy, so that the user plane network element sends, to the application function network element through the notification endpoint corresponding to the first QoS flow, the first reporting information or the second reporting information indicating whether the QoS requirement of the service data flow of the application corresponding to the first QoS flow can be satisfied. This provides a feasible solution for the user plane network element to report, to the application function network element, whether the QoS requirement of the service data flow of the application can be satisfied.

In a possible design, with reference to the second aspect or the possible designs of the second aspect, the receiving module is further configured to receive fifth indication information from the session management network element, where the fifth indication information is used to indicate the user plane network element to send the first reporting information to the application function network element; and that the sending module is further configured to send first reporting information to an application function network element includes: The user plane network element further sends the first reporting information to the application function network element based on the fifth indication information.

In a possible design, with reference to the second aspect or the possible designs of the second aspect, the receiving module is further configured to receive fifth indication information from the session management network element, where the fifth indication information is used to indicate the user plane network element to send the second reporting information to the application function network element; and that the sending module is further configured to send second reporting information to the application function network element includes: The user plane network element further sends the second reporting information to the application function network element based on the fifth indication information.

Based on the foregoing two possible designs, after receiving the fifth indication information sent by the session management network element, the user plane network element may clearly learn, based on the explicit fifth indication information, that the first reporting information or the second reporting information needs to be sent to the application function network element.

In a possible design, with reference to the second aspect or the possible designs of the second aspect, the sending module is further configured to send the first reporting information to the application function network element through a local network exposure network element.

In a possible design, with reference to the second aspect or the possible designs of the second aspect, the sending module is further configured to send the second reporting information to the application function network element through a local network exposure network element.

Based on the foregoing two possible designs, when sending the first reporting information or the second reporting information to the application function network element, the user plane network element may directly send the first reporting information or the second reporting information to the application function network element, or may send the first reporting information or the second reporting information to the application function network element through the local network exposure network element. This is not limited.

In a possible design, with reference to the second aspect or the possible designs of the second aspect, the receiving module is further configured to receive a second policy from the session management network element, where the second policy includes the identifier of the first QoS flow and information about a notification endpoint that is of the local network exposure network element and that corresponds to the identifier of the first QoS flow; the sending module is further configured to send, according to the second policy, the first reporting information to the local network exposure network element through the notification endpoint of the local network exposure network element; the local network exposure network element determines the notification endpoint of the application function network element based on the notification endpoint of the local network exposure network element; and the local network exposure network element sends the first reporting information to the application function network element by using the information about the notification endpoint of the application function network element.

In a possible design, with reference to the second aspect or the possible designs of the second aspect, the receiving module is further configured to receive a second policy from the session management network element, where the second policy includes the identifier of the first QoS flow and information about a notification endpoint that is of the local network exposure network element and that corresponds to the identifier of the first QoS flow; the sending module is further configured to send, according to the second policy, the second reporting information to the local network exposure network element through the notification endpoint of the local network exposure network element; the local network exposure network element determines the notification endpoint of the application function network element based on the notification endpoint of the local network exposure network element; and the local network exposure network element sends the second reporting information to the application function network element by using the information about the notification endpoint of the application function network element.

Based on the foregoing two possible designs, when sending the first reporting information or the second reporting information to the application function network element through the local network exposure network element, the user plane network element may send the first reporting information or the second reporting information to the local network exposure network element through the notification endpoint of the local network exposure network element, and then the local network exposure network element sends the first reporting information or the second reporting information to the application function network element by using the information about the notification endpoint of the application function network element. This provides a feasible solution for the user plane network element to send the first reporting information or the second reporting information to the application function network element through the local network exposure network element.

In a possible design, with reference to the second aspect or the possible designs of the second aspect, the receiving module is further configured to receive a fourth policy from the session management network element, where the fourth policy includes the identifier of the first QoS flow and a notification endpoint allocated by the session management network element; the sending module is further configured to send the first reporting information to the session management network element according to the fourth policy; and the session management network determines the notification endpoint of the application function network element or the notification endpoint of the local network exposure function based on the notification endpoint allocated by the session management network, and sends the first reporting information to the application function network element or sends the first reporting information to the application function network element through the local network exposure network element.

In a possible design, with reference to the second aspect or the possible designs of the second aspect, the receiving module is further configured to receive a fourth policy from the session management network element, where the fourth policy includes the identifier of the first QoS flow and a notification endpoint allocated by the session management network element; the sending module is further configured to send the second reporting information to the session management network element according to the fourth policy; and the session management network determines the notification endpoint of the application function network element or the notification endpoint of the local network exposure network element based on the notification endpoint allocated by the session management network, and sends the second reporting information to the application function network element or sends the second reporting information to the application function network element through the local network exposure network element.

Based on the foregoing two possible designs, when sending the first reporting information or the second reporting information to the application function network element through the session management network element, the user plane network element may send the first reporting information or the second reporting information to the application function network element directly or through the local network exposure network element.

In a possible design, with reference to the second aspect or the possible designs of the second aspect, the first reporting information further includes an identifier of the service data flow of the application.

In a possible design, with reference to the second aspect or the possible designs of the second aspect, the second reporting information further includes an identifier of the service data flow of the application.

Based on the foregoing two possible designs, when the first reporting information or the second reporting information includes the identifier of the service data flow of the application, the application function network element may determine, without parsing the first reporting information or the second reporting information, a specific service data flow that is of the application and that corresponds to the currently received first reporting information or second reporting information.

In a possible design, with reference to the second aspect or the possible designs of the second aspect, the receiving module is further configured to receive, from the session management network element, the identifier of the first QoS flow and the identifier that is of the service data flow of the application and that corresponds to the identifier of the first QoS flow; and the user plane network element determines the identifier of the service data flow of the application based on the identifier of the first QoS flow.

Based on this possible design, the user plane network element may determine a correspondence between the first QoS flow and the service data flow of the application based on the identifier of the first QoS flow and the identifier that is of the service data flow of the application and that corresponds to the identifier of the first QoS flow that are sent by the session management network element, to convert the indication information corresponding to the first QoS flow into the indication information corresponding to the service data flow of the application, and send the indication information to the application function network element.

In a possible design, with reference to the second aspect or the possible designs of the second aspect, the first message further includes an identifier of a first alternative QoS profile, the first reporting information further includes an identifier of a first alternative service requirement, and the identifier of the first alternative service requirement corresponds to the identifier of the first alternative QoS profile.

Based on this possible design, when the first message includes the identifier of the first alternative QoS profile, the user plane network element may determine a corresponding first alternative service requirement based on a first alternative QoS profile, include the identifier of the first alternative service requirement in the first reporting information, and send the first reporting information to the application function network element, so that the application function network element determines that a QoS requirement of the first alternative service requirement can be satisfied.

In a possible design, with reference to the second aspect or the possible designs of the second aspect, the receiving module is further configured to receive an identifier of an alternative service requirement and an identifier that is of an alternative QoS profile and that corresponds to the identifier of the alternative service requirement from the session management network element; and the user plane network element determines the identifier of the first alternative service requirement based on the identifier of the first alternative QoS profile.

Based on this possible design, the user plane network element receives the identifier of the alternative service requirement and the identifier that is of the alternative QoS profile and that corresponds to the identifier of the alternative service requirement that are sent by the session management network element, so that after receiving the first message including the first alternative QoS profile, the user plane network element determines the corresponding first alternative service requirement based on the first alternative QoS profile, and sends the identifier of the first alternative service requirement to the application function network element.

According to a third aspect, a communication apparatus is provided. The communication apparatus may be a user plane network element, or a chip or a system on chip in the user plane network element. The communication apparatus may implement functions performed by the user plane network element in the foregoing aspects or the possible designs, and the functions may be implemented by hardware. In a possible design, the communication apparatus may include a transceiver. The transceiver may be configured to support the communication apparatus in implementing the function in any one of the first aspect or the possible designs of the seventh aspect. For example, the transceiver may be configured to receive, from a first access network element, a first message including an identifier of a first quality of service flow QoS flow used to transmit a service data flow of an application and first indication information, where the first indication information is used to indicate whether a quality of service QoS requirement of the first QoS flow can be satisfied; and the transceiver may be further configured to send, to an application function network element based on the first message, first reporting information including second indication information, where the second indication information is used to indicate whether a QoS requirement of the service data flow of the application can be satisfied. In another possible design, the communication apparatus may further include a memory. The memory is configured to store computer-executable instructions and data that are necessary for the communication apparatus. When the communication apparatus runs, the transceiver executes the computer-executable instructions stored in the memory, so that the communication apparatus performs the reporting information sending method according to any one of the first aspect or the possible designs of the first aspect.

For a specific implementation of the communication apparatus, refer to a behavior function of the user plane network element in the reporting information sending method according to any one of the first aspect or the possible designs of the first aspect.

According to a fourth aspect, a communication apparatus is provided. The communication apparatus includes one or more processors and one or more memories, the one or more memories are coupled to the one or more processors, and the one or more memories is/are configured to store computer program code or computer instructions. When the one or more processors executes/execute the computer instructions, the communication apparatus is enabled to perform the reporting information sending method according to any one of the first aspect or the possible designs of the first aspect.

According to a fifth aspect, a computer-readable storage medium is provided. The computer-readable storage medium stores computer instructions or a program. When the computer instructions are run or the program runs on a computer, the computer is enabled to perform the reporting information sending method according to any one of the first aspect or the possible designs of the first aspect.

According to a sixth aspect, a computer program product including instructions is provided. When the computer program product runs on a computer, the computer is enabled to perform the reporting information sending method according to any one of the first aspect or the possible designs of the first aspect.

According to a seventh aspect, a chip system is provided. The chip system includes one or more processors and one or more memories, the one or more memories are coupled to the one or more processors, and the one or more memories stores/store computer program code or computer instructions. When the one or more processors executes/execute the computer program code or the computer instructions, the chip system is enabled to perform the reporting information sending method according to any one of the first aspect or the possible designs of the first aspect.

For technical effects achieved by any one of the design manners of the third aspect to the seventh aspect, refer to the technical effects achieved by any one of the possible designs of the first aspect and the second aspect. Details are not described again.

According to an eighth aspect, a reporting information sending method is provided. The method includes: A first access network element receives QoS notification control indication information of a first quality of service flow QoS flow from a session management network element, where the QoS notification control indication information is used to indicate to send a notification indicating whether a QoS requirement of a QoS flow can be satisfied; and the first access network element sends, to a user plane network element based on the QoS notification control indication information, a first message including an identifier of the first QoS flow and first indication information, and the first indication information is used to indicate whether a quality of service QoS requirement of the first QoS flow can be satisfied.

According to the foregoing method, the first access network element receives the QoS notification control indication information, and may clearly learn, based on the explicit QoS notification control indication information, that the first message including the identifier of the first QoS flow and the first indication information needs to be sent to the user plane network element. In comparison with an existing case in which an access network element reports indication information to an application function network element in a local data center sequentially through an access and mobility management network element, a session management network element, a policy control network element, and a network exposure network element in a central data center, that the first access network element sends the first message to the user plane network element can shorten a reporting path, and improve timeliness of reporting the indication information, so that an application function network element adjusts a service data flow of an application in a timely manner based on the indication information. For an application with high time sensitivity, a QoS requirement of the application can be satisfied in a timely manner.

In a possible design, with reference to the eighth aspect, when the first access network element determines that the QoS requirement of the first QoS flow cannot be satisfied, the first indication information is used to indicate that the QoS requirement of the first QoS flow cannot be satisfied; or when the first access network element determines that the QoS requirement of the first QoS flow can be satisfied, the first indication information is used to indicate that the QoS requirement of the first QoS flow can be satisfied.

Based on this possible design, the first access network element may determine the corresponding first indication information after determining whether the QoS requirement of the first QoS flow can be satisfied. This provides a feasible solution for the first access network element to obtain the first indication information.

In a possible design, with reference to the eighth aspect or the possible design of the eighth aspect, the first access network element further receives, from the session management network element, sixth indication information that is used to indicate the first access network element to send the identifier of the first QoS flow and the first indication information to the user plane network element by using the first message.

Based on this possible design, after receiving the sixth indication information, the first access network element may clearly learn, based on the explicit sixth indication information, that the identifier of the first QoS flow and the first indication information need to be sent to the user plane network element by using the first message.

In a possible design, with reference to the eighth aspect or the possible designs of the eighth aspect, when the first indication information is used to indicate that the QoS requirement of the first QoS flow cannot be satisfied, the method further includes: When user equipment moves from the first access network element to a second access network element, the first access network element sends the identifier of the first QoS flow to the second access network element.

Based on this possible design, when the user equipment moves from the first access network element to the second access network element, the first access network element sends, to the second access network element, the identifier of the first QoS flow corresponding to the first indication information, so that the second access network element can detect, based on the identifier of the first QoS flow, whether the QoS requirement of the first QoS flow can be satisfied.

In a possible design, with reference to the eighth aspect or the possible designs of the eighth aspect, the first access network element further receives at least one alternative QoS profile from the session management network element, and the method further includes: The first access network element sends an identifier of a first alternative QoS profile in the at least one alternative QoS profile to the user plane network element, where the first access network element can satisfy a QoS requirement corresponding to the first alternative QoS profile.

Based on this possible design, when receiving the at least one alternative QoS profile sent by the session management network element, the first access network element may determine, in the at least one alternative QoS profile, the first alternative QoS profile that can be satisfied by the first access network element, and send the identifier of the first alternative QoS profile to the user plane network element, so that the user plane network element determines an identifier of a corresponding first alternative service requirement based on the identifier of the first alternative QoS profile, and sends the identifier of the first alternative service requirement to the application function network element, and the application function network element determines, based on the identifier of the first alternative service requirement, that the QoS requirement of the first alternative service requirement may be satisfied.

In a possible design, with reference to the eighth aspect or the possible designs of the eighth aspect, the first access network element sends the identifier of the first alternative QoS profile to the second access network element.

Based on this possible design, the first access network element sends the identifier of the first alternative QoS profile to the second access network element, so that the second access network element learns of the alternative QoS profile that can be satisfied by the first access network element, and the second access network element sends, to the user plane network element when an alternative QoS profile that can be satisfied by the second access network element is different from the alternative QoS profile that can be satisfied by the first access network element, an identifier of the alternative QoS profile that can be satisfied by the second access network element. When the alternative QoS profile that can be satisfied by the second access network element is different from the alternative QoS profile that can be satisfied by the first access network element, the identifier of the alternative QoS profile that is satisfied by the second access network element may not need to be sent to the user plane network element, to reduce signaling interaction.

In a possible design, with reference to the eighth aspect or the possible designs of the eighth aspect, the second access network element receives, from the first access network element, an identifier that is of a QoS flow whose QoS requirement cannot be satisfied and that is notified by the first access network element to the user plane network element; and the second access network element sends, to the user plane network element based on the identifier of the first QoS flow, fourth indication information used to indicate that the QoS requirement of the first QoS flow can be satisfied.

Based on this possible design, after receiving the identifier that is of the first QoS flow and that is sent by the first access network element, the second access network element may detect, based on the identifier of the first QoS flow, whether the QoS requirement of the first QoS flow can be satisfied, and send, to the user plane network element, the fourth indication information used to indicate that the QoS requirement of the first QoS flow can be satisfied.

In a possible design, with reference to the eighth aspect or the possible designs of the eighth aspect, the second access network element receives at least one alternative QoS profile from the first access network element or the session management network element; the second access network element receives an identifier of a first alternative QoS profile from the first access network element, where the identifier of the first alternative QoS profile is an identifier corresponding to an alternative QoS profile that is sent by the first access network element to the user plane network element and whose QoS requirement can be satisfied by the first access network element; and the second access network element sends, to the user plane network element based on the at least one alternative QoS profile and the first alternative QoS profile, an identifier of a second alternative QoS profile whose QoS requirement can be satisfied by the second access network element.

Based on this possible design, after receiving the at least one alternative QoS profile, the second access network element may determine, in the at least one alternative QoS profile, the second alternative QoS profile whose QoS requirement can be satisfied by the second access network element, determine, based on the first alternative QoS profile sent by the first access network element, whether the second alternative QoS profile is the same as the first alternative QoS profile, and send the identifier of the second alternative QoS profile to the user plane network element if the second alternative QoS profile is different from the first alternative QoS profile; or may not send the identifier of the second alternative QoS profile to the user plane network element if the second alternative QoS profile is the same as the first alternative QoS profile, to reduce the signaling interaction.

According to a ninth aspect, a communication apparatus is provided. The communication apparatus may implement a function performed by the access network element in the second aspect or the possible design of the second aspect, and the function may be implemented by hardware by executing corresponding software. The hardware or the software includes one or more modules corresponding to the function. For example, the communication apparatus includes a receiving module and a sending module.

The receiving module is configured to receive QoS notification control indication information of a first quality of service flow QoS flow from a session management network element, where the QoS notification control indication information is used to indicate to send a notification indicating whether a QoS requirement of a QoS flow can be satisfied.

The sending module is configured to send, to a user plane network element based on the QoS notification control indication information, a first message including an identifier of the first QoS flow and first indication information, where the first indication information is used to indicate whether the quality of service QoS requirement of the first QoS flow can be satisfied.

For a specific implementation of the communication apparatus, refer to a behavior function of the access network element in the reporting information sending method according to any one of the eighth aspect or the possible designs of the eighth aspect. According to the communication apparatus described in the ninth aspect, the first access network element receives the QoS notification control indication information, and may clearly learn, based on the explicit QoS notification control indication information, that the first message including the identifier of the first QoS flow and the first indication information needs to be sent to the user plane network element. In comparison with an existing case in which an access network element reports indication information to an application function network element in a local data center sequentially through an access and mobility management network element, a session management network element, a policy control network element, and a network exposure network element in a central data center, that the first access network element sends the first message to the user plane network element can shorten a reporting path, and improve timeliness of reporting the indication information, so that an application function network element adjusts a service data flow of an application in a timely manner based on the indication information. For an application with high time sensitivity, a QoS requirement of the application can be satisfied in a timely manner.

In a possible design, with reference to the ninth aspect, when the first access network element determines that the QoS requirement of the first QoS flow cannot be satisfied, the first indication information is used to indicate that the QoS requirement of the first QoS flow cannot be satisfied; or when the first access network element determines that the QoS requirement of the first QoS flow can be satisfied, the first indication information is used to indicate that the QoS requirement of the first QoS flow can be satisfied.

Based on this possible design, the first access network element may determine the corresponding first indication information after determining whether the QoS requirement of the first QoS flow can be satisfied. This provides a feasible solution for the first access network element to obtain the first indication information.

In a possible design, with reference to the ninth aspect or the possible design of the ninth aspect, the receiving module is further configured to receive, from the session management network element, sixth indication information that is used to indicate the first access network element to send the identifier of the first QoS flow and the first indication information to the user plane network element by using the first message.

Based on this possible design, after receiving the sixth indication information, the first access network element may clearly learn, based on the explicit sixth indication information, that the identifier of the first QoS flow and the first indication information need to be sent to the user plane network element by using the first message.

In a possible design, with reference to the ninth aspect or the possible designs of the ninth aspect, the sending module is further configured to: when user equipment moves from the first access network element to a second access network element, the first access network element sends the identifier of the first QoS flow to the second access network element.

Based on this possible design, when the user equipment moves from the first access network element to the second access network element, the first access network element sends, to the second access network element, the identifier of the first QoS flow corresponding to the first indication information, so that the second access network element can detect, based on the identifier of the first QoS flow, whether the QoS requirement of the first QoS flow can be satisfied.

In a possible design, with reference to the ninth aspect or the possible designs of the ninth aspect, the receiving module is further configured to receive at least one alternative QoS profile from the session management network element; and the sending module is further configured to send, to the user plane network element, an identifier of a first alternative QoS profile that is in the at least one alternative QoS profile and that can satisfy a QoS requirement corresponding to the first alternative QoS profile.

Based on this possible design, when receiving the at least one alternative QoS profile sent by the session management network element, the first access network element may determine, in the at least one alternative QoS profile, the first alternative QoS profile that can be satisfied by the first access network element, and send the identifier of the first alternative QoS profile to the user plane network element, so that the user plane network element determines an identifier of a corresponding first alternative service requirement based on the identifier of the first alternative QoS profile, and sends the identifier of the first alternative service requirement to the application function network element, and the application function network element determines, based on the identifier of the first alternative service requirement, that the QoS requirement of the first alternative service requirement may be satisfied.

In a possible design, with reference to the ninth aspect or the possible designs of the ninth aspect, the sending module is further configured to send the identifier of the first alternative QoS profile to the second access network element.

Based on this possible design, the first access network element sends the identifier of the first alternative QoS profile to the second access network element, so that the second access network element learns of the alternative QoS profile that can be satisfied by the first access network element, and the second access network element sends, to the user plane network element when an alternative QoS profile that can be satisfied by the second access network element is different from the alternative QoS profile that can be satisfied by the first access network element, an identifier of the alternative QoS profile that can be satisfied by the second access network element. When the alternative QoS profile that can be satisfied by the second access network element is different from the alternative QoS profile that can be satisfied by the first access network element, the identifier of the alternative QoS profile that is satisfied by the second access network element may not need to be sent to the user plane network element, to reduce signaling interaction.

In a possible design, with reference to the ninth aspect or the possible designs of the ninth aspect, the receiving module is further configured to receive, from the first access network element, an identifier that is of a QoS flow whose QoS requirement cannot be satisfied and that is notified by the first access network element to the user plane network element; and the sending module is further configured to send, to the user plane network element based on the identifier of the first QoS flow, fourth indication information used to indicate that the QoS requirement of the first QoS flow can be satisfied.

Based on this possible design, after receiving the identifier that is of the first QoS flow and that is sent by the first access network element, the second access network element may detect, based on the identifier of the first QoS flow, whether the QoS requirement of the first QoS flow can be satisfied, and send, to the user plane network element, the fourth indication information used to indicate that the QoS requirement of the first QoS flow can be satisfied.

In a possible design, with reference to the ninth aspect or the possible designs of the ninth aspect, the receiving module is further configured to receive at least one alternative QoS profile from the first access network element or the session management network element; the receiving module is further configured to receive an identifier of a first alternative QoS profile from the first access network element, where the identifier of the first alternative QoS profile is an identifier corresponding to an alternative QoS profile that is sent by the first access network element to the user plane network element and whose QoS requirement can be satisfied by the first access network element; and the sending module is further configured to send, to the user plane network element based on the at least one alternative QoS profile and the first alternative QoS profile, an identifier of a second alternative QoS profile whose QoS requirement can be satisfied by the second access network element.

Based on this possible design, after receiving the at least one alternative QoS profile, the second access network element may determine, in the at least one alternative QoS profile, the second alternative QoS profile whose QoS requirement can be satisfied by the second access network element, determine, based on the first alternative QoS profile sent by the first access network element, whether the second alternative QoS profile is the same as the first alternative QoS profile, and send the identifier of the second alternative QoS profile to the user plane network element if the second alternative QoS profile is different from the first alternative QoS profile; or may not send the identifier of the second alternative QoS profile to the user plane network element if the second alternative QoS profile is the same as the first alternative QoS profile, to reduce the signaling interaction.

According to a tenth aspect, a communication apparatus is provided. The communication apparatus may be an access network element, or a chip or a system on chip in the access network element. The communication apparatus may implement functions performed by the access network element in the foregoing aspects or the possible designs, and the functions may be implemented by hardware. In a possible design, the communication apparatus may include a transceiver. The transceiver may be configured to support the communication apparatus in implementing the function in any one of the eighth aspect or the possible designs of the eighth aspect. For example, the transceiver may be configured to receive QoS notification control indication information of a first quality of service flow QoS flow from a session management network element, where the QoS notification control indication information is used to indicate to send a notification indicating whether a QoS requirement of a QoS flow can be satisfied; and the transceiver may be further configured to send, to a user plane network element based on the QoS notification control indication information, a first message including an identifier of the first QoS flow and first indication information, and the first indication information is used to indicate whether a quality of service QoS requirement of the first QoS flow can be satisfied. In another possible design, the communication apparatus may further include a memory. The memory is configured to store computer-executable instructions and data that are necessary for the communication apparatus. When the communication apparatus runs, the transceiver executes the computer-executable instructions stored in the memory, so that the communication apparatus performs the reporting information sending method according to any one of the eighth aspect or the possible designs of the eighth aspect.

For a specific implementation of the communication apparatus, refer to a behavior function of the access network element in the reporting information sending method according to any one of the eighth aspect or the possible designs of the eighth aspect.

According to an eleventh aspect, a communication apparatus is provided. The communication apparatus includes one or more processors and one or more memories, the one or more memories are coupled to the one or more processors, and the one or more memories is/are configured to store computer program code or computer instructions. When the one or more processors executes/execute the computer instructions, the communication apparatus is enabled to perform the reporting information sending method according to any one of the eighth aspect or the possible designs of the eighth aspect.

According to a twelfth aspect, a computer-readable storage medium is provided. The computer-readable storage medium stores computer instructions or a program. When the computer instructions are run or the program runs on a computer, the computer is enabled to perform the reporting information sending method according to any one of the eighth aspect or the possible designs of the eighth aspect.

According to a thirteenth aspect, a computer program product including instructions is provided. When the computer program product runs on a computer, the computer is enabled to perform the reporting information sending method according to any one of the eighth aspect or the possible designs of the eighth aspect.

According to a fourteenth aspect, a chip system is provided. The chip system includes one or more processors and one or more memories, the one or more memories are coupled to the one or more processors, and the one or more memories stores/store computer program code or computer instructions. When the one or more processors executes/execute the computer program code or the computer instructions, the chip system is enabled to perform the reporting information sending method according to any one of the eighth aspect or the possible designs of the eighth aspect.

For technical effects achieved by any one of the design manners of the tenth aspect to the fourteenth aspect, refer to the technical effects achieved by any one of the possible designs of the eighth aspect and the ninth aspect. Details are not described again.

According to a fifteenth aspect, a reporting information sending method is provided. The method includes: A session management network element receives, from a policy control network element, a third policy including quality of service QoS notification control indication information and information about a notification endpoint, where the QoS notification control indication information is used to indicate to send a notification indicating whether a QoS requirement of a QoS flow can be satisfied, and the notification endpoint is a notification endpoint that receives the notification indicating whether the QoS requirement can be satisfied; the session management network element sends, to a first access network element, an identifier of a first quality of service flow QoS flow and the QoS notification control indication information that are determined according to the third policy; the session management network element sends, to a user plane network element, a fourth policy including the identifier of the first QoS flow and a notification endpoint allocated by the session management network element; and the session management network element receives first reporting information from the user plane network element, and sends the first reporting information to the notification endpoint, where the first reporting information includes second indication information, and the second indication information may be used to indicate whether a QoS requirement of a service data flow of an application can be satisfied.

Based on the foregoing method, after receiving the third policy sent by the policy control network element, the session management network element sends the identifier of the first QoS flow and the QoS notification control indication information to the first access network element, so that the first access network element sends a first message to the user plane network element, and sends the identifier of the first QoS flow and the notification endpoint allocated by the session management network element to the user plane network element, so that the user plane network element generates the first reporting information based on the received first message, and sends the first reporting information to the session management network element.

In a possible design, with reference to the fifteenth aspect, the session management network element further sends, to the first access network element, sixth indication information used to indicate the access network element to send, to the user plane network element by using the first message, the notification indicating whether the QoS requirement can be satisfied.

Based on this possible design, the session management network element sends the explicit sixth indication information to the first access network element, to indicate the first access network element to send, to the user plane network element by using the first message, the notification indicating whether the QoS requirement can be satisfied.

In a possible design, with reference to the fifteenth aspect or the possible design of the fifteenth aspect, the third policy includes at least one alternative QoS parameter set and an identifier of an alternative service requirement corresponding to an identifier of each alternative QoS parameter set; the session management network element determines at least one alternative QoS profile based on the at least one alternative QoS parameter set; and a fourth policy further includes an identifier of the at least one alternative QoS profile and the identifier of the alternative service requirement corresponding to the identifier of the at least one alternative QoS profile.

Based on this possible design, the session management network element determines the at least one alternative QoS profile based on the at least one alternative QoS parameter set, and sends the identifier of the at least one alternative QoS profile and the identifier of the alternative service requirement corresponding to the identifier of the at least one alternative QoS profile to the user plane network element, so that after receiving an identifier of a first alternative QoS profile, the user plane network element determines an identifier of an alternative service requirement corresponding to the first alternative QoS profile.

In a possible design, with reference to the fifteenth aspect or the possible designs of the fifteenth aspect, the session management network element receives the identifier of the first quality of service flow QoS flow and first indication information from the first access network element, where the first indication information is used to indicate that a QoS requirement of the first QoS flow cannot be satisfied; the session management network element receives, from a second access network element, an identifier list of QoS flows accepted by the second access network element, where the identifier list includes the identifier of the first QoS flow; and the session management network element sends, to the user plane network element, fourth indication information used to indicate that the QoS requirement of the first QoS flow can be satisfied.

Based on this possible design, the session management network element determines, based on the first indication information that is sent by the first access network element and that is used to indicate that the QoS requirement of the first QoS flow cannot be satisfied, and the identifier list that is sent by the second access network element and that is of the QoS flows accepted by the second access network element, the fourth indication information used to indicate that the QoS requirement of the first QoS flow can be satisfied, and sends the fourth indication information to the user plane network element, so that the user plane network element obtains second reporting information based on the fourth indication information, and sends the second reporting information to an application function network element.

In a possible design, with reference to the fifteenth aspect or the possible designs of the fifteenth aspect, the session management network element receives, from the second access network element, an identifier list of QoS flows accepted by the second access network element; and the session management network element sends the identifier list to the user plane network element.

Based on this possible design, the session management network element forwards, to the user plane network element, the received identifier list of the QoS flows accepted by the second access network element, so that the user plane network element determines the second reporting information based on the identifier list, and sends the second reporting information to the application function network element.

According to a sixteenth aspect, a communication apparatus is provided. The communication apparatus may implement a function performed by the session management network element in the fifteenth aspect or the possible design of the fifteenth aspect, and the function may be implemented by hardware by executing corresponding software. The hardware or the software includes one or more modules corresponding to the function. For example, the communication apparatus includes a receiving module and a sending module.

The receiving module is configured to receive, from a policy control network element, a third policy including quality of service QoS notification control indication information and information about a notification endpoint, where the QoS notification control indication information is used to indicate to send a notification indicating whether a QoS requirement of a QoS flow can be satisfied, and the notification endpoint is a notification endpoint that receives the notification indicating whether the QoS requirement can be satisfied; the sending module is configured to send, to a first access network element, an identifier of a first quality of service flow QoS flow and the QoS notification control indication information that are determined according to the third policy; the session management network element sends, to a user plane network element, a fourth policy including the identifier of the first QoS flow and a notification endpoint allocated by the session management network element; the receiving module is further configured to receive first reporting information from the user plane network element; and the sending module is further configured to send the received first reporting information to an application function network element, where the first reporting information includes second indication information, and the second indication information may be used to indicate whether a QoS requirement of a service data flow of an application can be satisfied.

For a specific implementation of the communication apparatus, refer to a behavior function of the session management network element in the reporting information sending method according to any one of the fifteenth aspect or the possible designs of the fifteenth aspect. According to the communication apparatus described in the sixteenth aspect, after receiving the third policy sent by the policy control network element, the session management network element sends the identifier of the first QoS flow and the QoS notification control indication information to the first access network element, so that the first access network element sends a first message to the user plane network element, and sends the identifier of the first QoS flow and the notification endpoint allocated by the session management network element to the user plane network element, so that the user plane network element generates the first reporting information based on the received first message, and sends the first reporting information to the session management network element.

In a possible design, with reference to the sixteenth aspect, the sending module is further configured to send, to the first access network element, sixth indication information used to indicate the access network element to send, to the user plane network element by using the first message, the notification indicating whether the QoS requirement can be satisfied.

Based on this possible design, the session management network element sends the explicit sixth indication information to the first access network element, to indicate the first access network element to send, to the user plane network element by using the first message, the notification indicating whether the QoS requirement can be satisfied.

In a possible design, with reference to the sixteenth aspect or the possible design of the sixteenth aspect, the third policy includes at least one alternative QoS parameter set and an identifier of an alternative service requirement corresponding to an identifier of each alternative QoS parameter set; the communication apparatus further includes a processing module, where the processing module is configured to determine at least one alternative QoS profile based on the at least one alternative QoS parameter set; and the fourth policy further includes an identifier of the at least one alternative QoS profile and the identifier of the alternative service requirement corresponding to the identifier of the at least one alternative QoS profile.

Based on this possible design, the session management network element determines the at least one alternative QoS profile based on the at least one alternative QoS parameter set, and sends the identifier of the at least one alternative QoS profile and the identifier of the alternative service requirement corresponding to the identifier of the at least one alternative QoS profile to the user plane network element, so that after receiving an identifier of a first alternative QoS profile, the user plane network element determines an identifier of an alternative service requirement corresponding to the first alternative QoS profile.

In a possible design, with reference to the sixteenth aspect or the possible designs of the sixteenth aspect, the receiving module is further configured to receive, from the first access network element, the identifier of the first quality of service flow QoS flow and first indication information used to indicate that a QoS requirement of the first QoS flow cannot be satisfied; the receiving module is further configured to receive, from a second access network element, an identifier list of QoS flows accepted by the second access network element, where the identifier list includes the identifier of the first QoS flow; and the sending module is further used by the session management network element to send, to the user plane network element, fourth indication information used to indicate that the QoS requirement of the first QoS flow can be satisfied.

Based on this possible design, the session management network element determines, based on the first indication information that is sent by the first access network element and that is used to indicate that the QoS requirement of the first QoS flow cannot be satisfied, and the identifier list that is sent by the second access network element and that is of the QoS flows accepted by the second access network element, the fourth indication information used to indicate that the QoS requirement of the first QoS flow can be satisfied, and sends the fourth indication information to the user plane network element, so that the user plane network element obtains second reporting information based on the fourth indication information and sends the second reporting information to the session management network element, and then the session management network element sends the second reporting information to the application function network element.

In a possible design, with reference to the sixteenth aspect or the possible designs of the sixteenth aspect, the receiving module is further configured to receive, from the second access network element, the identifier list of the QoS flows accepted by the second access network element; and the sending module is further configured to send the identifier list to the user plane network element.

Based on this possible design, the session management network element forwards, to the user plane network element, the received identifier list of the QoS flows accepted by the second access network element, so that the user plane network element determines the second reporting information based on the identifier list and sends the second reporting information to the session management network element, and then the session management network element sends the second reporting information to the application function network element.

According to a seventeenth aspect, a communication apparatus is provided. The communication apparatus may be a session management network element, or a chip or a system on chip in the session management network element. The communication apparatus may implement functions performed by the session management network element in the foregoing aspects or the possible designs, and the functions may be implemented by hardware. In a possible design, the communication apparatus may include a transceiver. The transceiver may be configured to support the communication apparatus in implementing the function in any one of the fifteenth aspect or the possible designs of the fifteenth aspect. For example, the transceiver may be configured to receive, from a policy control network element, a third policy including quality of service QoS notification control indication information and information about a notification endpoint, where the QoS notification control indication information is used to indicate to send a notification indicating whether a QoS requirement of a QoS flow can be satisfied, and the notification endpoint is a notification endpoint that receives the notification indicating whether the QoS requirement can be satisfied. The transceiver may be further configured to send, to a first access network element, an identifier of a first quality of service flow QoS flow and the QoS notification control indication information that are determined according to the third policy. The transceiver is further configured to send a fourth policy including the identifier of the first QoS flow to a user plane network element. The transceiver is further configured to receive first reporting information from the user plane network element. The transceiver is further configured to send the received first reporting information to an application function network element, where the first reporting information includes second indication information, and the second indication information may be used to indicate whether a QoS requirement of a service data flow of an application can be satisfied. In another possible design, the communication apparatus may further include a memory. The memory is configured to store computer-executable instructions and data that are necessary for the communication apparatus. When the communication apparatus runs, the transceiver executes the computer-executable instructions stored in the memory, so that the communication apparatus performs the reporting information sending method according to any one of the fifteenth aspect or the possible designs of the fifteenth aspect.

For a specific implementation of the communication apparatus, refer to a behavior function of the session management network element in the reporting information sending method according to any one of the fifteenth aspect or the possible designs of the fifteenth aspect.

According to an eighteenth aspect, a communication apparatus is provided. The communication apparatus includes one or more processors and one or more memories, the one or more memories are coupled to the one or more processors, and the one or more memories is/are configured to store computer program code or computer instructions. When the one or more processors executes/execute the computer instructions, the communication apparatus is enabled to perform the reporting information sending method according to any one of the first aspect or the possible designs of the first aspect.

According to a nineteenth aspect, a computer-readable storage medium is provided. The computer-readable storage medium stores computer instructions or a program. When the computer instructions are run or the program runs on a computer, the computer is enabled to perform the reporting information sending method according to any one of the first aspect or the possible designs of the first aspect.

According to a twentieth aspect, a computer program product including instructions is provided. When the computer program product runs on a computer, the computer is enabled to perform the reporting information sending method according to any one of the first aspect or the possible designs of the first aspect.

According to a twenty-first aspect, a chip system is provided. The chip system includes one or more processors and one or more memories, the one or more memories are coupled to the one or more processors, and the one or more memories stores/store computer program code or computer instructions. When the one or more processors executes/execute the computer program code or the computer instructions, the chip system is enabled to perform the reporting information sending method according to any one of the first aspect or the possible designs of the first aspect.

For technical effects achieved by any one of the design manners of the seventeenth aspect to the twenty-first aspect, refer to the technical effects achieved by any one of the possible designs of the fifteenth aspect and the sixteenth aspect. Details are not described again.

According to a twenty-second aspect, a reporting information sending method is provided. The method includes: A policy control network element receives a service request including QoS notification control indication information and information about a notification endpoint, where the QoS notification control indication information is used to indicate to send a notification indicating whether a quality of service QoS requirement of a QoS flow can be satisfied, and the notification endpoint is a notification endpoint that receives the notification indicating whether the QoS requirement can be satisfied; and the policy control network element sends, to a session management network element, a third policy that includes the QoS notification control indication information and the information about the notification endpoint and that corresponds to the service request.

Based on the foregoing method, after receiving the service request, the policy control network element sends the QoS notification control indication information and the information about the notification endpoint to the session management network element, so that the session management network element sends the QoS notification control indication information to a first access network element, and sends the information about the notification endpoint to a user plane network element. Therefore, the first access network element sends the first message to the user plane network element based on the QoS notification control indication information, and the user plane network element sends, to an application function network element through the notification endpoint, first reporting information determined based on the first message.

In a possible design, with reference to the twenty-second aspect, the policy control network element receives seventh indication information used to indicate the policy control network element to send the information about the notification endpoint to the session management network element.

Based on this possible design, after receiving the seventh indication information, the policy control network element may clearly learn, based on the explicit seventh indication information, that the information about the notification endpoint needs to be sent to the session management network element, so that the session management network element subsequently sends the information about the notification endpoint to the user plane network element.

In a possible design, with reference to the twenty-second aspect or the possible design of the twenty-second aspect, the service request further includes eighth indication information used to indicate to send, through an optimized path, the notification indicating whether the QoS requirement can be satisfied.

Based on this possible design, after receiving the eighth indication information, the policy control network element may determine that the notification indicating whether the QoS requirement can be satisfied needs to be sent through the optimized path, and send the information about the notification endpoint to the session management network element based on the eighth indication information.

According to a twenty-third aspect, a communication apparatus is provided. The communication apparatus may implement a function performed by the policy control network element in the twenty-second aspect or the possible design of the twenty-second aspect, and the function may be implemented by hardware by executing corresponding software. The hardware or the software includes one or more modules corresponding to the function. For example, the communication apparatus includes a receiving module and a sending module.

The receiving module is configured to receive a service request including QoS notification control indication information and information about a notification endpoint, where the QoS notification control indication information is used to indicate to send a notification indicating whether a quality of service QoS requirement of a QoS flow can be satisfied, and the notification endpoint is a notification endpoint that receives the notification indicating whether the QoS requirement can be satisfied.

The sending module is configured to send, to a session management network element, a third policy that includes the QoS notification control indication information and the information about the notification endpoint and that corresponds to the service request.

For a specific implementation of the communication apparatus, refer to a behavior function of the policy control network element in the reporting information sending method according to any one of the twenty-second aspect or the possible designs of the twenty-second aspect. According to the communication apparatus according to the twenty-third aspect, after receiving the service request, the policy control network element sends the QoS notification control indication information and the information about the notification endpoint to the session management network element, so that the session management network element sends the QoS notification control indication information to a first access network element, and sends the information about the notification endpoint to a user plane network element. Therefore, the first access network element sends the first message to the user plane network element based on the QoS notification control indication information, and the user plane network element sends, to an application function network element through the notification endpoint, first reporting information determined based on the first message.

In a possible design, with reference to the twenty-third aspect, the receiving module is further configured to receive seventh indication information used to indicate the policy control network element to send the information about the notification endpoint to the session management network element.

Based on this possible design, after receiving the seventh indication information, the policy control network element may clearly learn, based on the explicit seventh indication information, that the information about the notification endpoint needs to be sent to the session management network element, so that the session management network element subsequently sends the information about the notification endpoint to the user plane network element.

In a possible design, with reference to the twenty-third aspect or the possible design of the twenty-third aspect, the service request further includes eighth indication information used to indicate to send, through an optimized path, the notification indicating whether the QoS requirement can be satisfied.

Based on this possible design, after receiving the eighth indication information, the policy control network element may determine that the notification indicating whether the QoS requirement can be satisfied needs to be sent through the optimized path, and send the information about the notification endpoint to the session management network element based on the eighth indication information.

According to a twenty-fourth aspect, a communication apparatus is provided. The communication apparatus may be a policy control network element, or a chip or a system on chip in the policy control network element. The communication apparatus may implement functions performed by the policy control network element in the foregoing aspects or the possible designs, and the functions may be implemented by hardware. In a possible design, the communication apparatus may include a transceiver. The transceiver may be configured to support the communication apparatus in implementing the function in any one of the twenty-second aspect or the possible designs of the twenty-second aspect. For example, the transceiver may be configured to receive a service request including QoS notification control indication information and information about a notification endpoint, where the QoS notification control indication information is used to indicate to send a notification indicating whether a quality of service QoS requirement of a QoS flow can be satisfied, and the notification endpoint is a notification endpoint that receives the notification indicating whether the QoS requirement can be satisfied; and the transceiver may be further configured to send, to a session management network element, a third policy that includes the QoS notification control indication information and the information about the notification endpoint and that corresponds to the service request. In another possible design, the communication apparatus may further include a memory. The memory is configured to store computer-executable instructions and data that are necessary for the communication apparatus. When the communication apparatus runs, the transceiver executes the computer-executable instructions stored in the memory, so that the communication apparatus performs the reporting information sending method according to any one of the twenty-second aspect or the possible designs of the twenty-second aspect.

For a specific implementation of the communication apparatus, refer to a behavior function of the policy control network element in the reporting information sending method according to any one of the twenty-second aspect or the possible designs of the twenty-second aspect.

According to a twenty-fifth aspect, a communication apparatus is provided. The communication apparatus includes one or more processors and one or more memories, the one or more memories are coupled to the one or more processors, and the one or more memories is/are configured to store computer program code or computer instructions. When the one or more processors executes/execute the computer instructions, the communication apparatus is enabled to perform the reporting information sending method according to any one of the first aspect or the possible designs of the first aspect.

According to a twenty-sixth aspect, a computer-readable storage medium is provided. The computer-readable storage medium stores computer instructions or a program. When the computer instructions are run or the program runs on a computer, the computer is enabled to perform the reporting information sending method according to any one of the first aspect or the possible designs of the first aspect.

According to a twenty-seventh aspect, a computer program product including instructions is provided. When the computer program product runs on a computer, the computer is enabled to perform the reporting information sending method according to any one of the first aspect or the possible designs of the first aspect.

According to a twenty-eighth aspect, a chip system is provided. The chip system includes one or more processors and one or more memories, the one or more memories are coupled to the one or more processors, and the one or more memories stores/store computer program code or computer instructions. When the one or more processors executes/execute the computer program code or the computer instructions, the chip system is enabled to perform the reporting information sending method according to any one of the first aspect or the possible designs of the first aspect.

For technical effects achieved by any one of the design manners of the twenty-fourth aspect to the twenty-eighth aspect, refer to the technical effects achieved by any one of the possible designs of the twenty-second aspect and the twenty-third aspect. Details are not described again.

According to a twenty-ninth aspect, a communication system is provided. The communication system includes the communication apparatus according to any one of the second aspect or the possible designs of the second aspect and the communication apparatus according to any one of the sixteenth aspect or the possible designs of the sixteenth aspect.

According to a thirtieth aspect, a communication system is provided. The communication system includes the communication apparatus according to any one of the second aspect or the possible designs of the second aspect, the communication apparatus according to any one of the sixteenth aspect or the possible designs of the sixteenth aspect, and the communication apparatus according to any one of the twenty-third aspect or the possible designs of the twenty-third aspect.

According to a thirty-first aspect, a communication system is provided. The communication system includes the communication apparatus according to any one of the second aspect or the possible designs of the second aspect, the communication apparatus according to any one of the ninth aspect or the possible designs of the ninth aspect, the communication apparatus according to any one of the sixteenth aspect or the possible designs of the sixteenth aspect, and the communication apparatus according to any one of the twenty-third aspect or the possible designs of the twenty-third aspect.

DETAILED DESCRIPTION OF ILLUSTRATIVE EMBODIMENTS

A reporting information sending method provided in embodiments of this application may be used for any communication system. The communication system may be a 3rd generation partnership project (3GPP) communication system, for example, a long term evolution (LTE) system; or may be a 5th generation (5G) mobile communication system, a new radio (NR) system, an NR V2X system, or another next-generation communication system; or may be a non-3GPP communication system. This is not limited. The following describes, by using FIG. 1 as an example, the reporting information sending method provided in embodiments of this application.

Figure 1:
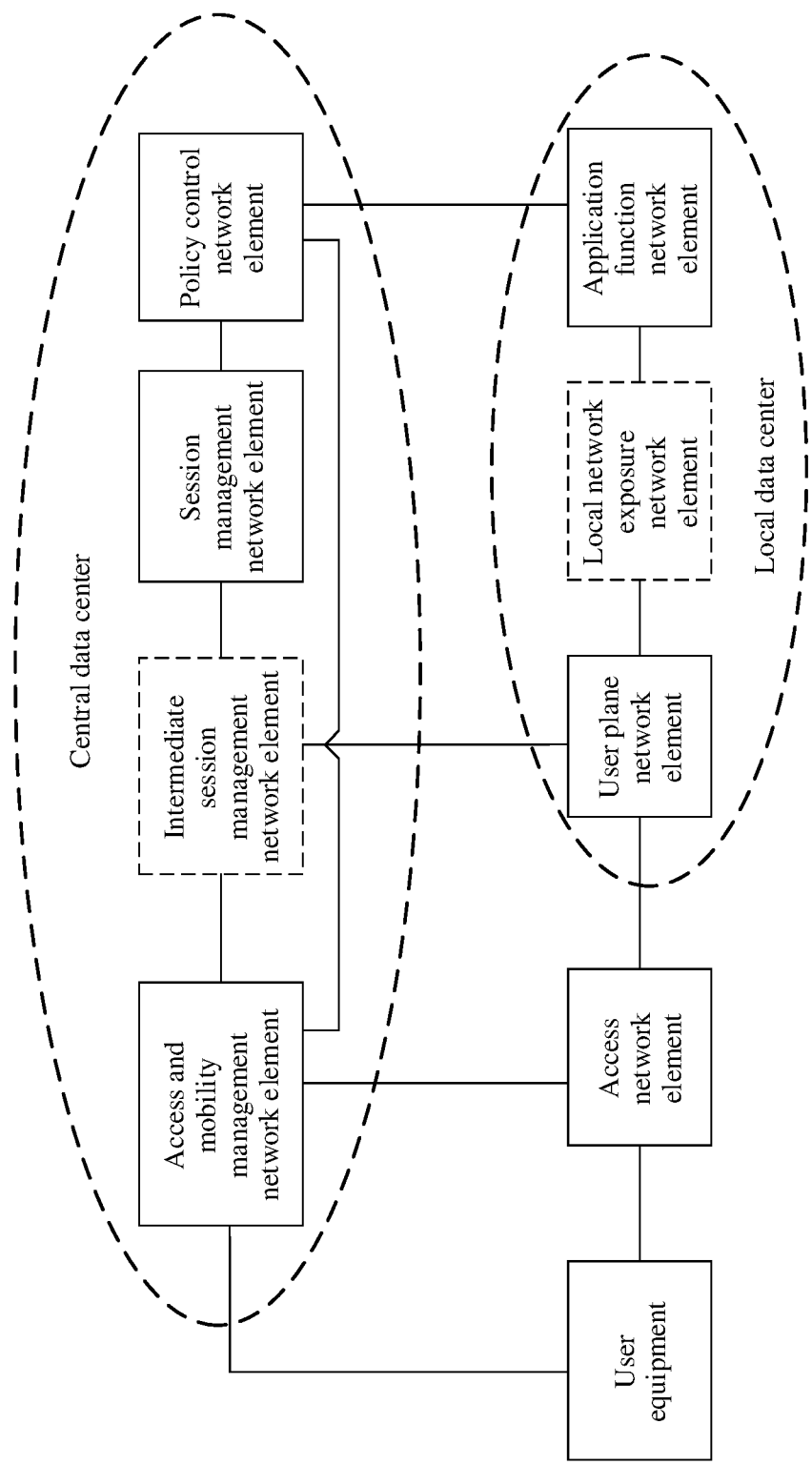
FIG. 1 is a simplified schematic diagram of a communication system according to an embodiment of the present invention.

FIG. 1 is a schematic diagram of a communication system according to an embodiment of this application. As shown in FIG. 1, the communication system may include at least one user equipment, an access network element, an access and mobility management (access and mobility management function, AMF) network element, a session management (session management function, SMF) network element, a policy control (policy control function, PCF) network element, a user plane (user plane function, UPF) network element, a network exposure (network exposure function, NEF) network element, an application function (AF) network element, and a data network (DN). As shown in FIG. 1, the application function network element may be deployed in the DN, or may be deployed outside the DN, and is connected to a core network element: the policy control network element or the network exposure network element. The application function network element may be a third-party application control platform, or may be a device of an operator. The application function network element may serve a plurality of application servers.

The user equipment in FIG. 1 may be located within a cell coverage area of the access network element, or may be located outside the cell coverage area of the access network element. The user equipment may perform air interface communication with the access network element over an uplink (UL). The user equipment sends data to the access network element over the UL. The access network element forwards the received data to the core network element. The core network element processes the data, and delivers the processed data to the user equipment through the access network element. For example, the user equipment sends uplink data to the access network element over the UL through a physical uplink shared channel (PUSCH), the access network element forwards the received uplink data to the core network element, and the core network element processes the uplink data and delivers the processed uplink data to the core network element through the access network element. The access network element that forwards the uplink data from the user equipment to the core network element and an access network element that forwards downlink data from the core network element to the user equipment may be a same access network element, or may be different access network elements.

Alternatively, the user equipment may communicate with the core network element through a specific interface. For example, the user equipment may communicate, through an N1 interface, with the access and mobility management network element belonging to the core network element.

After accessing a network, the user equipment may establish a protocol data unit (PDU) session, access the external data network DN by using the PDU session, and interact with the application function network element deployed in the DN. As shown in FIG. 1, based on different DNs accessed by a user, a network may select, according to a network policy, a user plane network element that accesses the DN as an anchor, namely, a protocol data unit anchor (PDU session anchor, PSA), of a PDU session, and access an application function network element through an N6 interface of the PSA. Application function network elements of a same application may be deployed at a plurality of locations. The network may select, based on an access location of the user equipment, a PSA that is near to the user equipment and that can support the user equipment to access the DN, to reduce routing roundabout and reduce a network delay. Generally, the application function network element is deployed in a mobile edge computing (MEC) environment. For an application, QoS information of a transmission path of a service data flow needs to be sensed, so that corresponding adjustment is performed at an application layer.

The user equipment (UE) in FIG. 1 may be referred to as a terminal, a mobile station (MS), a mobile terminal (MT), or the like. Specifically, the user equipment in FIG. 1 may be a mobile phone, a tablet computer, or a computer having a wireless transceiver function. Alternatively, the user equipment may be a virtual reality (VR) terminal, an augmented reality (AR) terminal, a wireless terminal in industrial control, a wireless terminal in unmanned driving, a wireless terminal in telemedicine, a wireless terminal in a smart grid, a wireless terminal in a smart city, a wireless terminal in a smart home, a vehicle-mounted terminal, a vehicle having a vehicle-to-vehicle (V2V) communication capability, an intelligent connected vehicle, an unmanned aerial vehicle having a UAV-to-UAV (U2U) communication capability, or the like. This is not limited.

The access network element in FIG. 1 may be any device having a wireless transceiver function, and is mainly configured to implement functions such as a radio physical control function, resource scheduling and radio resource management, radio access control, and mobility management. Specifically, the access network element may be an access network (AN) device/a radio access network (RAN) device, may be a device including a plurality of 5G-AN/5G-RAN nodes, or may be a NodeB (NB), an evolved NodeB (eNB), a next generation NodeB (gNB), a transmission reception point (TRP), a transmission point (TP), a road side unit (RSU), any other access node, or the like. This is not limited.

The access and mobility management network element in FIG. 1 is mainly responsible for work such as access authentication and mobility management of the user equipment, and signaling interaction between functional network elements, for example, managing a registration status of a user, a connection status of the user, user registration and network access, tracking area update, user authentication during cell switching, and key security.

The session management network element in FIG. 1 may be referred to as a session management function, a multicast/broadcast service management function (MB-SMF), a multicast session management network element, or the like. This is not limited. The session management network element is mainly configured to implement a user plane transmission logical channel, for example, a session management function such as establishment, release, and modification of a packet data unit (PDU) session. In some scenarios, the SMF may not be able to directly manage UPFs in some areas. As shown in FIG. 1, an intermediate session management (intermediate SMF, I-SMF) network element may be inserted to manage these UPFs.

The policy control network element in FIG. 1 is configured to: determine, based on a QoS requirement of a service data flow of an application, a QoS parameter set corresponding to the service data flow of the application, formulate a policy and charging control rule (PCC rule) based on the QoS parameter set, and send the PCC rule to the session management network element.

The user plane network element in FIG. 1 may be referred to as a PDU session anchor (PSA), a user plane function, or a multicast/broadcast user plane function (MB-UPF). The user plane network element may be used as an anchor on a user plane transmission logical channel, and is mainly configured to complete functions such as routing and forwarding of user plane data. For example, the user plane network element establishes a channel (namely, the user plane transmission logical channel) to a terminal, forwards a data packet between the terminal and a DN on the channel, and is responsible for data packet filtering, data forwarding, rate control, generation of charging information, and the like for the terminal. A multicast/broadcast (MB) service controller (MB service controller) has service management functions such as group management, security management, and service announcement.

The application function network element in FIG. 1 is mainly an intermediate functional entity that provides interaction between an application server and a network element in a core network. The application server may use the application function network element to dynamically control quality of service and charging of a network, ensure an SLA requirement, obtain running information of a network element in the core network, and the like. In embodiments of this application, the application function network element may be a functional entity deployed by an operator, or may be a functional entity deployed by a service provider. The service provider may be a third-party service provider, or may be a service provider inside the operator. This is not limited. When the application function network element is the functional entity deployed by the operator, the application function network element may directly interact with a network element in the core network. When the application function network element is the functional entity deployed by the third-party service provider, the application function network element may interact with a network element in the core network through the network exposure network element in FIG. 1.

It should be noted that a plurality of terminals, the access network element, and the core network element in embodiments of this application each may be one or more chips, or may be a system on chip (SOC), or the like. FIG. 1 is merely an example diagram, and a quantity of devices included in FIG. 1 is not limited. In addition, in addition to the devices shown in FIG. 1, the communication system may further include another device. Names of the devices and the links in FIG. 1 are not limited. In addition to the names shown in FIG. 1, the devices and the links may have other names. In addition to the network elements shown in FIG. 1, the network shown in FIG. 1 may further include a network slice selection (Network Slice Selection Function, NSSF) network element, a network repository (Network Repository Function, NRF) network element, an authentication server (authentication server function, AUSF) network element, a unified data repository (UDR) network element, a network data analytics (network data analytics function, NWDAF) network element, and the like. This is not limited.

Currently, in a conventional technology, as shown in FIG. 1, indication information indicating whether a QoS requirement of a QoS flow generated by the access network element can be satisfied is reported to the application function network element in a local data center sequentially through the access and mobility management network element, the session management network element, the policy control network element, and the network exposure network element in a central data center. Because the indication information generated by the access network element needs to be reported to the application function network element through the plurality of core network elements, a reporting path is long, and timeliness of reporting the indication information is reduced, this is unfavorable for the application function network element to adjust a service data flow of an application in a timely manner based on the indication information. For an application with high time sensitivity, a QoS requirement of the application cannot be satisfied in a timely manner.

To resolve the problems, as shown in FIG. 1, an embodiment of this application provides a reporting information sending method. The indication information generated by the access network element is reported to the application function network element through the user plane network element in the local data center. In comparison with the conventional technology, the reporting path can be shortened, and the timeliness of reporting the indication information can be improved, so that the application function network element adjusts the service data flow of the application in a timely manner based on the indication information. For an application with high time sensitivity, a QoS requirement of the application can be satisfied in a timely manner. Specifically, for the implementation method, refer to the following embodiments corresponding to methods shown in FIG. 3 to FIG. 10.

Figure 2:
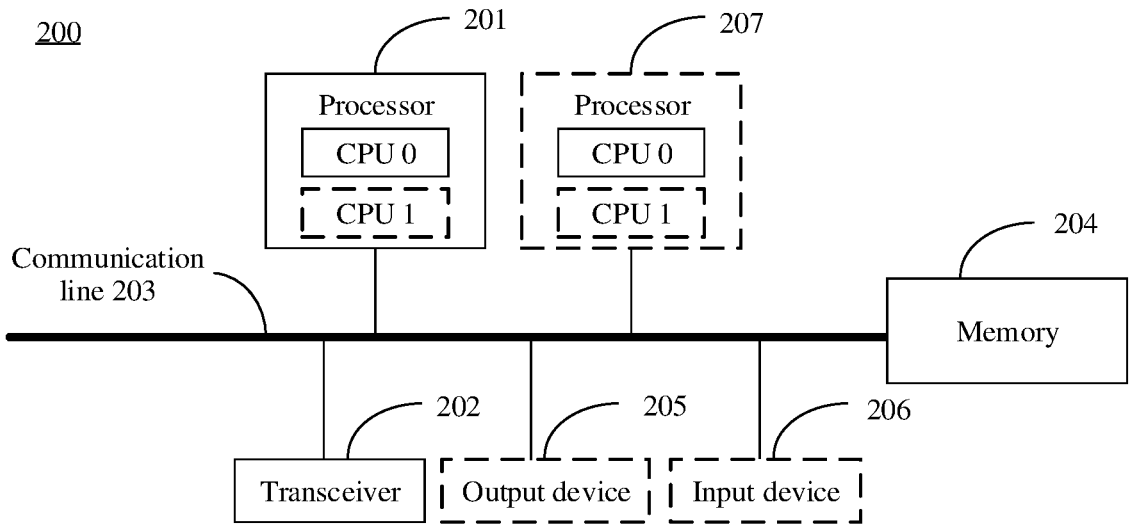
FIG. 2 is a schematic composition diagram of a communication apparatus according to an embodiment of the present invention.

During specific implementation, as shown in FIG. 1, for example, each of the terminals, the access network element, and the core network element may use a composition structure shown in FIG. 2, or include components shown in FIG. 2. FIG. 2 is a schematic composition diagram of a communication apparatus 200 according to an embodiment of this application. The communication apparatus 200 may be a terminal or a chip or a system on chip in the terminal, may be an access network element or a chip or a system on chip in the access network element, or may be a core network element or a chip or a system on chip in the core network element. As shown in FIG. 2, the communication apparatus 200 includes a processor 201, a transceiver 202, and a communication line 203.

Further, the communication apparatus 200 may further include a memory 204. The processor 201, the memory 204, and the transceiver 202 may be connected through the communication line 203.

The processor 201 is a central processing unit (CPU), a general-purpose processor, a network processor (NP), a digital signal processor (DSP), a microprocessor, a microcontroller, a programmable logic device (PLD), or any combination thereof. Alternatively, the processor 201 may be another apparatus having a processing function, for example, a circuit, a component, or a software module. This is not limited.

The transceiver 202 is configured to communicate with another device or another communication network. The another communication network may be an Ethernet, a radio access network (RAN), a wireless local area network (WLAN), or the like. The transceiver 202 may be a module, a circuit, a transceiver, or any apparatus that can implement communication.

The communication line 203 is configured to transmit information between the components included in the communication apparatus 200.

The memory 204 is configured to store instructions. The instructions may be a computer program.

The memory 204 may be a read-only memory (ROM) or another type of static storage device that can store static information and/or instructions; may be a random access memory (RAM) or another type of dynamic storage device that can store information and/or instructions; or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or the like. This is not limited.

It should be noted that the memory 204 may exist independently of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to implement the reporting information sending method provided in the following embodiments of this application.

In an example, the processor 201 may include one or more CPUs, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device, for example, a keyboard, a mouse, a microphone, or a joystick, and the output device 205 is a device, for example, a display screen or a speaker.

It should be noted that the communication apparatus 200 may be a desktop computer, a portable computer, a network server, a mobile phone, a tablet computer, a wireless terminal, an embedded device, a chip system, or a device having a structure similar to that in FIG. 2. In addition, the composition structure shown in FIG. 2 does not constitute a limitation on the communication apparatus. In addition to the components shown in FIG. 2, the communication apparatus may include more or fewer components than those shown in the figure, some components may be combined, or different component arrangements may be used.

In embodiments of this application, the chip system may include a chip, or may include the chip and another discrete component.

In addition, mutual reference may be made to actions, terms, and the like in embodiments of this application. This is not limited. In embodiments of this application, names of messages exchanged between devices, names of parameters in the messages, or the like are merely examples. In specific implementation, other names may alternatively be used. This is not limited.

With reference to the communication system shown in FIG. 1, the following describes the reporting information sending method provided in embodiments of this application by using an example in which a first access network element reports, to a user plane network element, first indication information used to indicate whether a QoS requirement of a first QoS flow can be satisfied, and the user plane network element processes the first indication information to obtain first reporting information and reports the first reporting information to an application function network element. The first access network element may be any access network element in the communication system, and the first QoS flow may be any QoS flow in a network. The access network element, the user plane network element, and the application function network element described in the following embodiments may have the components shown in FIG. 2.

Figure 3:
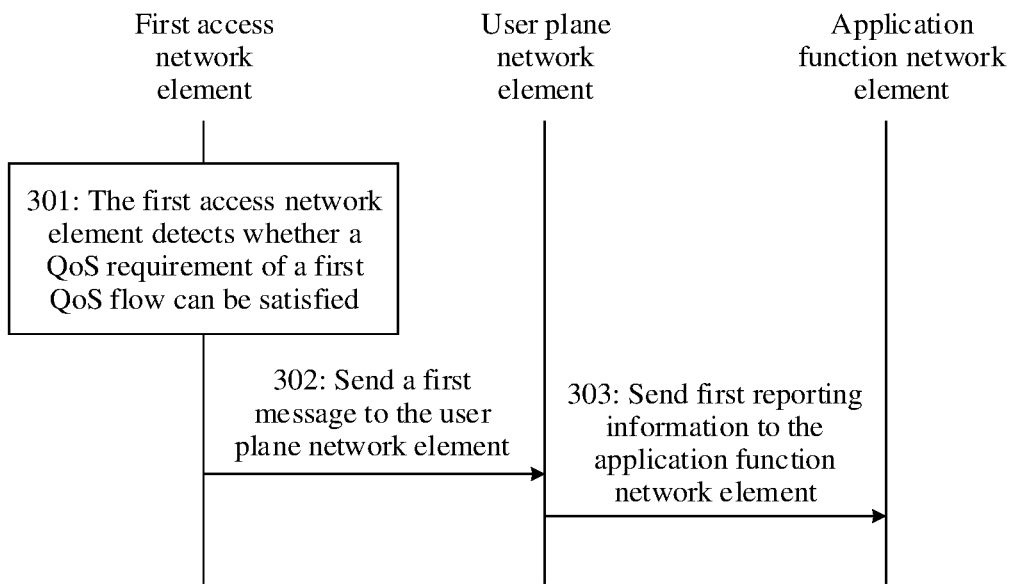
FIG. 3 is a schematic diagram of a reporting information sending method according to an embodiment of the present invention.

FIG. 3 is a flowchart of a reporting information sending method according to an embodiment of this application. Before the method in FIG. 3 is performed, a session management network element has determined, by using a conventional technology, a corresponding QoS flow for a service data flow corresponding to an application. As shown in FIG. 3, the method may include the following steps.

Step 301: A first access network element detects whether a QoS requirement of a first QoS flow can be satisfied.

The first QoS flow may be used to transmit a service data flow corresponding to an application. This may be described as follows: The first QoS flow may be used to transmit, from the first access network device to user equipment, a service data flow corresponding to an application. A policy control network element determines a QoS parameter of a corresponding PCC rule based on a QoS requirement of the service data flow of the application. The session management network element further determines a QoS parameter of the first QoS flow (namely, the QoS requirement of the first QoS flow) based on the QoS parameter. Finally, the QoS requirement of the first QoS flow satisfies the QoS requirement of the service data flow corresponding to the application, that is, when the service data flow that corresponds to the application is transmitted by using the first QoS flow, the QoS requirement of the service data flow may be satisfied.

The QoS requirement of the first QoS flow may include one or more of a maximum bandwidth (namely, a maximum transmission bit rate, max bit rate), a guaranteed bandwidth (namely, a guaranteed bit rate, guaranteed bit rate), a packet delay budget, and a packet error rate. The QoS requirement of the service data flow may include one or more of a media type, a maximum requested bandwidth, a minimum requested bandwidth, a maximum supported bandwidth, a minimum expected bandwidth, a maximum packet loss rate, and a QoS reference identifier.

For example, that a first access network element detects whether a QoS requirement of a first QoS flow can be satisfied may include: The first access network element detects current actual quality of service of the first QoS flow; and if the current actual quality of service of the first QoS flow satisfies the QoS requirement of the first QoS flow, the first access network element determines that the QoS requirement of the first QoS flow can be satisfied; otherwise, the first access network element determines that the QoS requirement of the QoS flow cannot be satisfied.

For example, whether the guaranteed bandwidth of the first QoS flow is satisfied is detected. The first access network device may detect a minimum transmission rate of the service data flow transmitted by using the first QoS flow in a period of time, and determine whether the minimum transmission rate of the service data flow satisfies a transmission rate that guarantees transmission. If the minimum transmission rate of the service data flow is greater than or equal to the guaranteed transmission rate, the first access network device determines that the QoS requirement of the first QoS flow can be satisfied. Otherwise, if the minimum transmission rate of the service data flow is less than the transmission rate that guarantees the transmission, the first access network device determines that the QoS requirement of the QoS flow cannot be satisfied.

Step 302: The first access network element sends a first message to a user plane network element.

The first message may include an identifier of the first QoS flow and first indication information; or the first message may include first indication information. For example, the first access network device may encapsulate the identifier of the first QoS flow and the first indication information into the first message based on sixth indication information. The sixth indication information may be used to indicate to send the identifier of the first QoS flow and the first indication information to the user plane network element by using a same message, and the sixth indication information may be sent by the session management network element to the first access network element.

The identifier of the first QoS flow may be used to identify the first QoS flow, and the identifier of the first QoS flow may be a QFI, a 5QI, or the like. This is not limited. The identifier of the first QoS flow may be sent by the session management network element to the first access network device when the session management network element determines the first QoS flow.

When the first message includes the identifier of the first QoS flow and the first indication information, the identifier of the first QoS flow corresponds to the first indication information, and the first indication information may be used to indicate whether the QoS requirement of the first QoS flow can be satisfied, or may be used to indicate whether a QoS requirement of a QoS flow can be satisfied. For example, if the first access network element detects that the QoS requirement of the first QoS flow cannot be satisfied, the first indication information is used to indicate that the QoS requirement of the first QoS flow cannot be satisfied. If the first access network element detects that the QoS requirement of the first QoS flow can be satisfied (usually determines, through re-detection, that the QoS requirement of the first QoS flow can be satisfied), the first indication information is used to indicate that the QoS requirement of the first QoS flow can be satisfied.

When the first message includes the first indication information, the first indication information may be used to explicitly indicate whether the QoS requirement of the first QoS flow can be satisfied. For example, when the first message includes the first indication information, the first indication information may include the identifier of the first QoS flow. Alternatively, when the first message includes the first indication information, the first indication information is used to indicate whether a QoS requirement of a QoS flow can be satisfied. In this case, the first indication information corresponds to or has a binding relationship with the first QoS flow. For example, a correspondence between a QoS flow and a message type may be preconfigured. A message type of the first indication information is the same as a message type corresponding to the first QoS flow. It may be determined, by using the message type of the first indication information and the correspondence between a QoS flow and a message type, that the first indication information is used to indicate whether the QoS requirement of the first QoS flow can be satisfied.

For example, that the first access network element sends a first message to a user plane network element may include: The first access network device sends the first message to the user plane network element based on indication information used to indicate to send, through an optimized path, a notification indicating whether the QoS requirement can be satisfied.

The optimized path may be a shortest/optimal path on which an application function network element reports whether the QoS requirement can be satisfied. In this embodiment of this application, the optimized path may include a path from the access network element to the user plane network element in a local data center, and then to the application function network element. From a perspective of the first access network element, the optimized path may be considered as a path for reporting, through a user plane, whether the QoS requirement can be satisfied.

Figure 4:
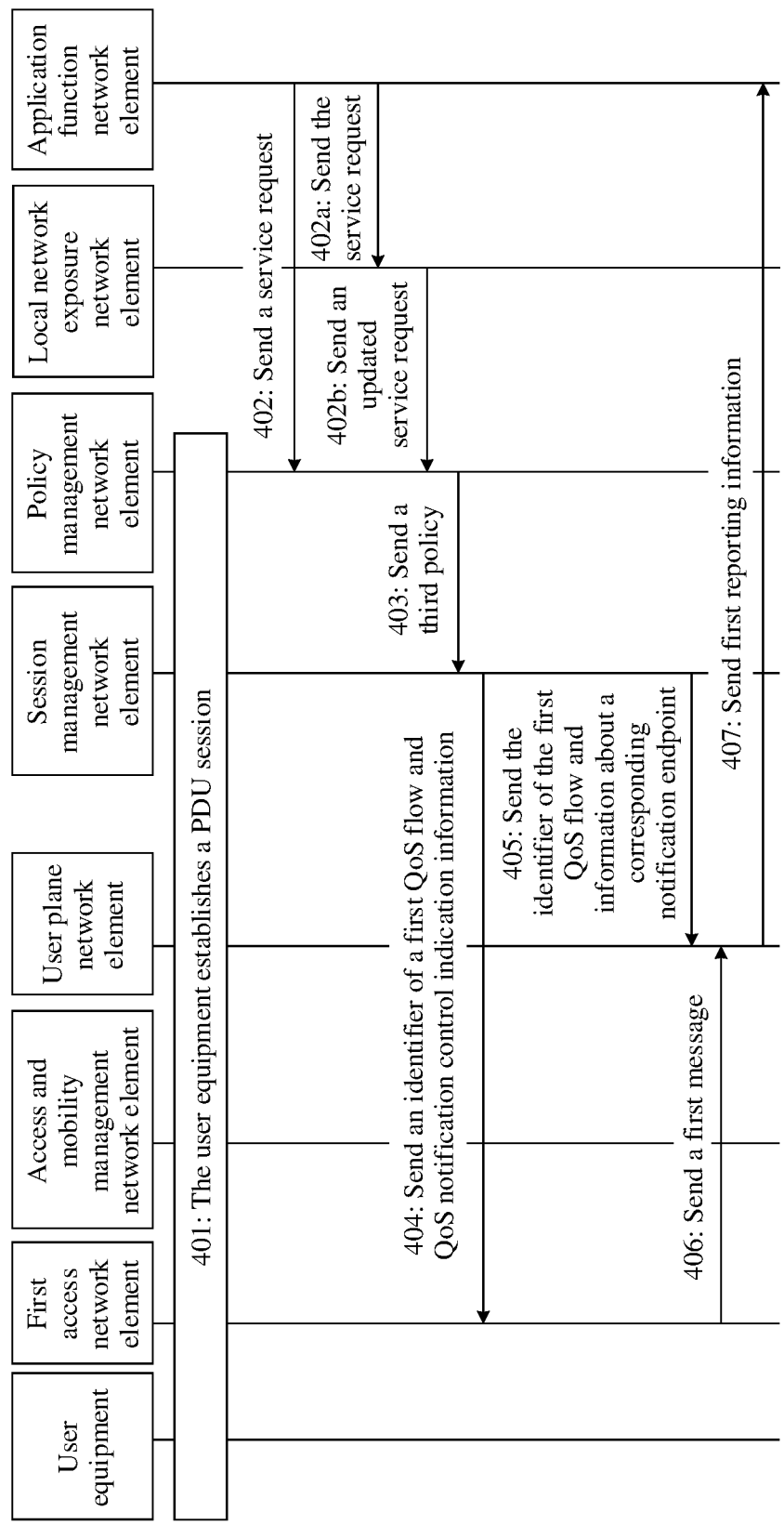
FIG. 4 is a schematic diagram of a reporting information sending method according to an embodiment of the present invention.

Specifically, for related descriptions of the optimized path and a configuration manner of the indication information used to indicate to send, through the optimized path, the notification indicating whether the QoS requirement can be satisfied, refer to the descriptions in the embodiment corresponding to FIG. 4.

Step 303: The user plane network element receives the first message, and sends first reporting information to the application function network element based on the first message.

The first reporting information may include second indication information. The second indication information may be used to indicate whether the QoS requirement of the service data flow of the application can be satisfied. If the first indication information is used to indicate that the QoS requirement of the first QoS flow cannot be satisfied, it is determined that the second indication information is used to indicate that the QoS requirement of the service data flow of the application corresponding to the first QoS flow cannot be satisfied; or if the first indication information is used to indicate that the QoS requirement of the first QoS flow can be satisfied, the second indication information is used to indicate that the QoS requirement of the service data flow of the application corresponding to the first QoS flow can be satisfied.

Optionally, in addition to the second indication information, the first reporting information further includes an identifier of the service data flow, where the identifier of the service data flow may be used to identify the service data flow.

Specifically, when the first message includes the identifier of the first QoS flow and the first indication information, and the identifier of the first QoS flow corresponds to the first indication information, after receiving the first message, the user plane network element may determine, based on the identifier of the first QoS flow in the first message and a correspondence between an identifier of a QoS flow and an identifier of a service data flow of an application, the service data flow of the application corresponding to the first QoS flow, generate, based on the first indication information, the second indication information used to indicate whether the QoS requirement of the service data flow of the application can be satisfied, include the second indication information in the first reporting information, and report the first reporting information to the application function network element.

When the first message includes the first indication information, and the first indication information includes the identifier of the first QoS flow, the user plane network element may determine, based on the identifier of the first QoS flow included in the first indication information and a correspondence between an identifier of a QoS flow and an identifier of a service data flow of an application, the service data flow of the application corresponding to the first QoS flow, generate, based on the first indication information, the second indication information used to indicate whether the QoS requirement of the service data flow of the application can be satisfied, include the second indication information in the first reporting information, and report the first reporting information to the application function network element.

When the first message includes the first indication information, and the first indication information corresponds to the first QoS flow, the user plane network element may determine the first QoS flow based on the first indication information, for example, determine the first QoS flow based on the message type of the first indication information and the correspondence between a QoS flow and a message type, determine, based on the identifier of the first QoS flow and the correspondence between an identifier of a QoS flow and an identifier of a service data flow of an application, the service data flow of the application corresponding to the first QoS flow, generate, based on the first indication information, the second indication information used to indicate whether the QoS requirement of the service data flow of the application can be satisfied, include the second indication information in the first reporting information, and report the first reporting information to the application function network element.

The correspondence between an identifier of a QoS flow and an identifier of a service data flow of an application may be sent by the session management network element to the user plane network element after the session management network element determines, by using the conventional technology, the QoS flow corresponding to the service data flow of the application.

In an example, that the user plane network element sends first reporting information to the application function network element may include: The user plane network element sends the first reporting information to the application function network element based on the indication information used to indicate to send, through the optimized path, the notification indicating whether the QoS requirement can be satisfied.

The indication information used to indicate to send, through the optimized path, the notification indicating whether the QoS requirement can be satisfied may be sent by the session management network element to the user plane network element. Specifically, for this process, refer to descriptions in the embodiment corresponding to FIG. 4.

In another example, that the user plane network element sends first reporting information to the application function network element may include: The user plane network element sends the first reporting information to the application function network element based on fifth indication information used to indicate the user plane network element to send the first reporting information to the application function network element.

The fifth indication information may be sent by the session management network element to the user plane network element. Specifically, for this process, refer to descriptions in the embodiment corresponding to FIG. 4.

Specifically, that the user plane network element sends first reporting information to the application function network element may include:

Manner 1: The user plane network element sends, through a notification endpoint of the application function network element, the first reporting information to the application function network element based on information that is about the notification endpoint and that is included in the first policy.

The first policy may be sent by the session management network element to the user plane network element, and the information that is about the notification endpoint and that is included in the first policy may be used to indicate the notification endpoint of the application function network element.

Specifically, for related descriptions and an implementation process of the first policy, refer to the descriptions in the embodiment corresponding to FIG. 4.

Manner 2: The user plane network element sends the first reporting information to a notification endpoint of a local network exposure network element based on information that is about the notification endpoint and that is included in a second policy, and sends the first reporting information to the application function network element through the local network exposure network element.

The second policy may be sent by the session management network element to the user plane network element, and the information that is about the notification endpoint and that is included in the second policy may be used to indicate the notification endpoint of the local network exposure network element.

Specifically, for related descriptions and an implementation process of the second policy, refer to the descriptions in the embodiment corresponding to FIG. 4.

Manner 3: The user plane network element sends the first reporting information to a notification endpoint of the session management network element based on a notification endpoint that is allocated by the session management network element and that is included in a fourth policy (excluding information about a notification endpoint of the application function network element or information about a notification endpoint of a local network exposure network element, where in a previous PDU session establishment process, if the session management network element has sent an event notification address of the session management network element to the user plane network element, the fourth policy further includes a notification association identifier allocated by the session management network element, and the notification association identifier is specifically a notification sequence number or an event reporting rule identifier), and sends the first reporting information to the application function network element through the session management network element. The session management network element may directly send the first reporting information to the application function network element, or further send the first reporting information to the application function network element through the local network exposure network element.

The fourth policy may be sent by the session management network element to the user plane network element. In this case, the session management network element is deployed in the local data center.

Specifically, for related descriptions and an implementation process of the fourth policy, refer to the descriptions in the embodiment corresponding to FIG. 4.

Further, after receiving the first reporting information, the application function network element may adjust the service data flow of the application based on the first reporting information, to satisfy the QoS requirement of the application.

It should be noted that FIG. 3 is described by using an example in which whether a QoS requirement of a QoS flow is satisfied. Similarly, refer to FIG. 3. Whether QoS requirements of two or more QoS flows are satisfied may be detected, and whether a QoS requirement of a service data flow corresponding to each QoS flow is satisfied is sent to the application function network element based on whether the QoS requirement of each QoS flow is satisfied. One application may include a plurality of service data flows, different service data flows correspond to different QoS flows, and different QoS flows may correspond to different access network elements.

For example, an application may include a service data flow 11 and a service data flow 12. The service data flow 11 corresponds to a QoS flow 1, and the QoS flow 1 corresponds to an access network element 1. The service data flow 12 corresponds to a QoS flow 2, and the QoS flow 2 corresponds to an access network element 2. The access network element 1 may send, to the user plane network element, first indication information indicating whether a QoS requirement of the QoS flow 1 can be satisfied. The access network element 2 may send, to the user plane network element, first indication information indicating whether a QoS requirement of the QoS flow 2 can be satisfied. After receiving the first indication information sent by the access network element 1, the user plane network element sends, to the application function network element based on the service data flow 11 corresponding to the QoS flow 1, second indication information indicating whether a QoS requirement of the service data flow 11 can be satisfied. After receiving the first indication information sent by the access network element 2, the user plane network element sends, to the application function network element based on the service data flow 12 corresponding to the QoS flow 2, second indication information indicating whether a QoS requirement of the service data flow 12 can be satisfied, so that the application function network element adjusts the service data flow of the application in a timely manner based on the second indication information sent by the user plane network element, to satisfy a QoS requirement of the application.

According to the method shown in FIG. 3, this embodiment of this application points out that the first indication information generated by the access network element is sent to the user plane network element in the local data center, and the user plane network element processes the first indication information to obtain the second indication information, and reports the second indication information to the application function network element. In comparison with an existing case in which an access network element reports indication information to an application function network element in a local data center sequentially through an access and mobility management network element, a session management network element, a policy control network element, and a network exposure network element in a central data center, a reporting path can be shortened, and timeliness of reporting the indication information can be improved, so that the application function network element adjusts the service data flow of the application in a timely manner based on the indication information. For an application with high time sensitivity, a QoS requirement of the application can be satisfied in a timely manner.

Refer to FIG. 4. The following describes in detail the reporting information sending method in which the application function network element reports, through the optimized path, the notification indicating whether the QoS requirement can be satisfied in the method shown in FIG. 3.

FIG. 4 shows a reporting information sending method according to an embodiment of this application. The method includes the following steps.

Step 401: User equipment establishes a PDU session.

For a process in which the user equipment establishes the PDU session, refer to a conventional technology. Details are not described.

After the PDU session is established, a first access network element may store a correspondence between core network tunnel information of a user plane network element in a local data center and an uplink data packet that can be accepted by the user plane network element. The core network tunnel information of the user plane network element may include an internet protocol address (IP address) of the user plane network element and a tunnel endpoint identifier. The IP address of the user plane network element may be used to identify the user plane network element, and the tunnel endpoint identifier may identify a tunnel between the user plane network element and the first access network element. A session management network element provides a notification address of an event report for the user plane network element.

Step 402: An application function network element sends a service request to a policy control network element.

The service request may correspond to a service data flow of an application, and the service request may be used to request a notification indicating whether a QoS requirement of the service data flow of the application can be satisfied. The service request may include description information of the service data flow (which may include description information of one or more service data flows), a QoS requirement of the service data flow (for example, a media type, a QoS reference identifier, a maximum requested bandwidth, a minimum requested bandwidth, a maximum supported bandwidth, a minimum expected bandwidth, and/or a maximum packet loss rate), QoS notification control indication information, and information about a notification endpoint. The QoS notification control indication information may be used to indicate the notification indicating whether the QoS requirement of the service data flow of the application can be satisfied. The QoS reference identifier corresponds to a QoS policy configured on the policy control network element. The application function network element replaces an application server of the application to send the service request to the policy control network element. Interaction between the application function network element and the application server is not limited in this application.

The information about the notification endpoint may include a notification target address; or the information about the notification endpoint may include a notification target address and a notification association identifier. The notification endpoint may be an endpoint that is included in the application function network element and that is configured to receive the notification indicating whether the QoS requirement of the service data flow of the application can be satisfied. The application function network element may allocate different target notification addresses or allocate a same target notification address to different notification requests. If the application function network element allocates a same target notification address to different notification requests, the application function network element needs to allocate different notification association identifiers for differentiation.

For example, an application function network element 1 exists in a network, and the application function network element 1 may correspond to an application 1 and an application 2. For the application 1, a service request 1 may include description information of a service data flow 11 and a service data flow 12, and the service request 1 may correspond to a notification endpoint 1 of the application function network element. For the application 2, a service request 2 may include a service data flow 21 and a service data flow 22, and the service request 2 may correspond to a notification endpoint 2 of the application function network element 1.

Optionally, when the service request includes the description information of the plurality of service data flows, the application function network element allocates, to each service data flow, an identifier of the service data flow.

Optionally, when the service request includes the information about the notification endpoint, the service request may alternatively implicitly indicate to send, to the application function network element through an optimized path, the notification indicating whether the QoS requirement of the service data flow of the application can be satisfied. Alternatively, the service request further includes eighth indication information, and the eighth indication information is used to explicitly indicate to send, to the application function network element through an optimized path, the notification indicating whether the QoS requirement of the service data flow of the application can be satisfied.

Optionally, in addition to the QoS notification control indication information and the information about the notification endpoint, the service request further includes one or more of the following information: seventh indication information, an identifier of the application function network element, an identifier of a terminal, and an identifier of an event.

Optionally, when the service request may further include one or more optional alternative service requirements, each alternative service requirement includes one QoS reference identifier.

The seventh indication information may be used to indicate the policy control network element to send the information about the notification endpoint to the session management network element.

The service request may further include location information of the application.

For the identifier of the service data flow of the application, refer to the descriptions in FIG. 4. Details are not described again.

The identifier of the application function network element may be identity information of the application function network element, other information used to indicate the application function network element, or the like.

The identifier of the terminal may be identity information of the terminal, other information used to indicate the terminal, or the like.

The identifier of the event may be used to indicate the event of detecting whether the QoS requirement of the service data flow can be satisfied.

Optionally, the service request may be carried in a policy create request or a policy authorization create request (Npcf-policy authorization-create request) message, and the application function network element sends the policy create request message to the policy control network element.

For example, the application function network element may interact with a binding support function (BSF) network element to obtain an address of the policy control network element, and send the service request to the policy control network element based on the address of the policy control network element. The address of the policy control network element may be used to identify the policy control network element. For a process in which the application function network element interacts with the BSF network element to obtain the address of the policy control network element, refer to the conventional technology. Details are not described.

For example, the application function network element may send the service request to the policy control network element through a local network exposure network element, that is, step 402 may be replaced with step 402a and step 402b.

Step 402a: The application function network element sends a service request to the local network exposure network element.

Step 402b: The local network exposure network element sends an updated service request to the policy control network element based on the received service request.

The updated service request may include information about a notification endpoint of the local network exposure network element, and the information about the notification endpoint of the local network exposure network element may include a notification target address of the local network exposure network element; or a notification target address and a notification association identifier of the local network exposure network element. The notification endpoint of the local network exposure network element may be an endpoint that is included in the local network exposure network element and that is configured to receive the notification indicating whether the QoS requirement of the service data flow of the application can be satisfied.

Specifically, after receiving the service request sent by the application function network element, the local network exposure network element determines, based on the information about the notification endpoint of the application function network element included in the service request and a correspondence between the notification endpoint of the application function and the notification endpoint of the local network exposure function, the notification endpoint that is of the local network exposure network element and that corresponds to the notification endpoint of the application function network element, updates the information about the notification endpoint of the application function network element in the service request to the information about the notification endpoint of the local network exposure network element, and sends the updated service request to the policy control network element.

Optionally, the local network exposure network element interacts with the BSF network element to obtain the address of the policy control network element, and sends the updated service request to the policy control network element based on the address of the policy control network element. The address of the policy control network element may be used to identify the policy control network element. For a process in which the local network exposure network element interacts with the BSF network element to obtain the address of the policy control network element, refer to the conventional technology. Details are not described.

Step 403: The policy control network element receives the service request, and sends a third policy to the session management network element based on the received service request.

The third policy includes a PCC rule. The policy control network element formulates the PCC rule based on the service request. The PCC rule includes a service data flow template determined based on the description information of the service data flow and a QoS parameter determined based on the QoS requirement of the service data flow. If the service request includes the plurality of service data flows, the policy control network element may formulate different PCC rules for different service data flows, and include corresponding identifiers of the service data flows in the PCC rule. The policy control network element sends the PCC rule to the session management network element. For related descriptions of the PCC rule, refer to the conventional technology. Details are not described.

In addition, the PCC rule includes QoS notification control indication information and information about a notification endpoint. The QoS notification control indication information may be described above. It should be noted that, when the application function network element sends the service request to the policy control network element, the notification endpoint included in the PCC rule is the information about the notification endpoint of the application function network element; or when the application function network element sends the service request to the policy control network element through the local network exposure network element, the information about the notification endpoint included in the PCC rule is the information about the notification endpoint of the local network exposure network element.

Optionally, when the service request includes the identifier of the event, the policy control network element sends the identifier of the event to the session management network element. The identifier of the event may be described above. Details are not described again.

Optionally, when the service request includes the seventh indication information, the policy control network element sends the third policy to the session management network element based on the seventh indication information.

Optionally, when the service request includes one or more alternative service requirements corresponding to the service data flow, the policy control network element determines a corresponding alternative QoS parameter set based on each alternative service requirement. Each alternative QoS parameter set includes an identifier of the alternative QoS parameter set, an alternative QoS parameter (for example, a 5QI or a GBR), and an identifier of a corresponding alternative requirement. The policy control network element includes the one or more alternative QoS parameter sets in a corresponding PCC rule.

Optionally, when the service request includes the eighth indication information, the policy control network element sends the third policy to the session management network element when determining, based on the eighth indication information, to send, to the application function network element through the optimized path, the notification indicating whether the QoS requirement of the service data flow of the application can be satisfied.

Further, optionally, when the service request includes the eighth indication information, the policy control network element further sends the received eighth indication information to the session management network element, so that the session management network element determines, based on the eighth indication information, to send, to the application function network element through the optimized path, the notification indicating whether the QoS requirement of the service data flow of the application can be satisfied, and sends the information about the notification endpoint to the user plane network element.

The eighth indication information and/or the identifier of the event may be carried in the third policy and sent to the session management network element.

Further, when the application function network element sends the service request to the policy control network element, after receiving the service request, the policy control network element returns an acknowledgment message to the application function network element, indicating that the policy control network element has successfully received the service request.

Further, when step 402a and step 402b are performed and the local network exposure network element sends the service request to the policy control network element, after receiving the updated service request, the policy control network element may return an acknowledgment message to the local network exposure network element, indicating that the policy control network element has successfully received the updated service request. After receiving the acknowledgment message returned by the policy control network element, the local network exposure network element may return an acknowledgment message to the application function network element, indicating that the local network exposure network element has successfully received the service request.

Step 404: The session management network element receives the third policy, and sends an identifier of a first QoS flow and the QoS notification control indication information to the first access network element according to the third policy.

Optionally, the session management network element determines, based on the QoS parameter in the PCC rule sent by the policy management network element, the first QoS flow used to transmit the service data flow of the application. That the session management network element determines, based on the QoS parameter sent by the policy management network element, the first QoS flow used to transmit the service data flow of the application may include: creating, based on the QoS parameter, a new QoS flow as the first QoS flow, or modifying an existing QoS flow as the first QoS flow (that is, performing QoS flow binding in the PCC rule). If the new QoS flow is created, the session management network element may allocate an identifier of the QoS flow to the QoS flow, formulate a corresponding QoS profile based on the QoS parameter in the PCC rule, and send the identifier of the first QoS flow and the corresponding QoS profile to the first access network element. If the existing QoS flow is modified as the first QoS flow, the session management network element does not need to allocate an identifier to the modified QoS flow, but needs to modify an existing QoS profile. In this case, the session management network element sends the identifier of the first QoS flow and a modified QoS profile to the first access network element, and the first access network device may store the identifier of the first QoS flow and the QoS profile. The session management network element stores a correspondence between the identifier of the first QoS flow and the notification endpoint in the corresponding PCC rule based on a binding result. If the policy control network element provides a plurality of PCC rules, the session management network element may bind different PCC rules to different QoS flows, and the session management network element stores a correspondence among an identifier of a QoS flow, a notification endpoint, and an identifier of a service data flow based on a binding result.

Optionally, when one PCC rule includes one or more alternative QoS parameter sets, the session management network element specifies an alternative QoS profile based on each alternative QoS parameter set. Each alternative QoS profile includes an identifier of the alternative QoS profile and an alternative QoS parameter (for example, a 5QI or a GBR). The session management network element sends the one or more alternative QoS profiles to the first access network element. The session management network element stores a correspondence between the identifier of the alternative QoS profile and an identifier of an alternative service requirement.

It should be noted that, in addition to sending the identifier of the first QoS flow and the QoS notification control indication information to the first access network element, the session management network element may further send one or both of sixth indication information and the eighth indication information to the first access network element through an access and mobility management network element.

The sixth indication information may be used to indicate the first access network element to send the identifier of the first QoS flow and first indication information to the user plane network element by using a first message. The eighth indication information is described above. Details are not described again.

Specifically, the session management network element may send the identifier of the first QoS flow and the QoS notification control indication information to the access and mobility management network element, and the access and mobility management network element sends the identifier of the first QoS flow and the QoS notification control indication information to the first access network element.

When the session management network element is connected to the access and mobility management network element, the session management network element may directly send the identifier of the first QoS flow and the QoS notification control indication information to the access and mobility management network element.

When the session management network element is not connected to the access and mobility management network element, the session management network element may send the identifier of the first QoS flow and the QoS notification control indication information to an intermediate session management network element (I-SMF), and the intermediate session management network element sends the identifier of the first QoS flow and the QoS notification control indication information to the access and mobility management network element.

Step 405: The session management network element receives the third policy, and sends, to the user plane network element according to the received third policy, the identifier of the first QoS flow and information about a notification endpoint corresponding to the identifier of the first QoS flow.

Specifically, the session management network element may determine a correspondence between an identifier of a QoS flow and a notification endpoint based on the binding result of the QoS flow in the PCC rule. If the PCC rule includes the identifier of the service data flow, a correspondence among an identifier of a QoS flow, a notification endpoint, and an identifier of a service data flow of an application may be further determined, to determine the service data flow of the application corresponding to the first QoS flow. Therefore, the session management network element sends the identifier of the first QoS flow, the notification endpoint, and information about an identifier of the service data flow of the application to the user plane network element.

For a manner of obtaining the correspondence between the identifier of the service data flow and the information about the notification endpoint and related descriptions, refer to the foregoing descriptions. Details are not described again.

In a possible design, when the notification endpoint included in the third policy is the information about the notification endpoint of the application function network element, the information about the notification endpoint corresponding to the identifier of the first QoS flow is the information about the notification endpoint of the application function network element. In this case, the identifier of the first QoS flow and the information about the notification endpoint that is of the application function network element and that corresponds to the identifier of the first QoS flow may be carried in a first policy and sent to the user plane network element.

In another possible design, when the information about the notification endpoint included in the third policy is the information about the notification endpoint of the local network exposure function network element, the information about the notification endpoint corresponding to the identifier of the first QoS flow is the information about the notification endpoint of the local network exposure function network element. In this case, the identifier of the first QoS flow and the information about the notification endpoint that is of the local network exposure function network element and that corresponds to the identifier of the first QoS flow may be carried in a second policy and sent to the user plane network element.

In another possible design, when the session management network element determines that the session management network element sends the notification to the application function network element, the session management network element does not send the information about the notification endpoint of the application function network element or the information about the notification endpoint of the local network exposure function network element to the user plane network element, but allocates a notification association identifier. (In this case, the user plane network element sends the notification to the session management network element based on an event reporting address and the newly provided notification association identifier that are provided by the session management network element in a PDU session establishment process. That is, the notification endpoint in this case is the event reporting address and the notification association identifier. The notification endpoint included by the session management network element in a fourth policy rule is the notification association identifier.)

Optionally, when one PCC rule includes one or more alternative QoS parameter sets, the session management network element further sends an identifier of a QoS profile and an identifier of a corresponding alternative service requirement to the user plane network element.

For example, the third policy includes the eighth indication information. When determining, based on the eighth indication information included in the third policy, that the notification indicating whether the QoS requirement of the service data flow of the application can be satisfied needs to be sent through the optimized path, the session management network element sends the identifier of the first QoS flow and the notification endpoint corresponding to the identifier of the first QoS flow to the user plane network element.

Further, optionally, the session management network element sends fifth indication information to the user plane network element, where the fifth indication information may be used to indicate the user plane network element to send first reporting information to the application function network element.

To be specific, it can be learned from the foregoing that, in addition to sending the identifier of the first QoS flow and the information about the notification endpoint corresponding to the identifier of the first QoS flow to the user plane network element, the session management network element may further send the eighth indication information and the fifth indication information to the user plane network element. Optionally, each piece of information sent by the session management network element to the user plane network element may be carried in an N4 session modification message, to reduce signaling interaction.

Step 406: The first access network element receives the identifier of the first QoS flow and the QoS notification control indication information, detects, based on the QoS notification control indication information, whether a QoS requirement of the first QoS flow is satisfied, and sends the first message to a user plane network element based on a detection result.

For specific descriptions of the first message and step 406, refer to the descriptions in step 401 and step 402. Details are not described again.

For example, the first access network element may further receive, from the session management network element, the sixth indication information that is used to indicate the first access network element to send the identifier of the first QoS flow and the first indication information to the user plane network element by using the first message, and send the identifier of the first QoS flow and the first indication information to the user plane network element by using the first message based on the sixth indication information.

Step 407: The user plane network element receives the first message, and sends the first reporting information to the application function network element based on the first message.

Specifically, the user plane network element generates, based on the first indication information in the first message, the first reporting information including second indication information, and determines a notification endpoint of the first reporting information based on the identifier of the first QoS flow included in the first message and the correspondence that is between the identifier of the first QoS flow and the notification endpoint and that is sent by the session management network element, so as to send the first reporting information to the application function network element.

For related descriptions of the second indication information, refer to the descriptions in step 403. Optionally, if the user plane network element receives the correspondence among an identifier of a QoS flow, a notification endpoint, and an identifier of a service data flow from the session management network element, the first reporting information further includes the identifier of the service data flow of the application. In other words, in addition to the second indication information, the first reporting information may further include the identifier of the service data flow of the application.

If the user plane network element receives the identifier of the QoS profile and the identifier of the corresponding alternative service requirement from the session management network element, and the first message further includes the identifier of the QoS profile, the first reporting information may further include the identifier of the corresponding alternative service requirement.

In a possible design, when the user plane network element receives the first policy sent by the session management network element, the user plane network element may send, based on the information about the notification endpoint of the application function network element included in the first policy, the first reporting information to the application function network element through the notification endpoint of the application function network element.

In another possible design, when the user plane network element receives the second policy sent by the session management network element, the user plane network element may send, based on the information about the notification endpoint of the local network exposure function network element included in the second policy, the first reporting information to the local network exposure network element through the local network exposure network element. The local network exposure network element determines the notification endpoint that is of the application function network element and that corresponds to the notification endpoint of the local network exposure network element, and sends the first reporting information to the application function network element through the determined notification endpoint of the application function network element.

In another possible design, when the user plane network element receives the fourth policy sent by the session management network element, the user plane network element sends the first reporting information to the session management network element, and the session management network element determines the notification endpoint of the local network exposure network element or the application function network element, to further send the first reporting information.

Optionally, when the session management network element sends the fifth indication information to the user plane network element, the user plane network element sends the first reporting information to the application function network element based on the fifth indication information sent by the session management network element; or when the session management network element sends the eighth indication information to the user plane network element, the user plane network element sends the first reporting information to the application function network element based on the eighth indication information sent by the session management network element.

For related descriptions of the fifth indication information and the eighth indication information, refer to the foregoing descriptions. Details are not described again.

Step 401 to step 407 describe a specific process in which the first access network element reports, to the application function network element through the user plane network element, whether the QoS requirement can be satisfied.

Further, optionally, the first access network element further sends the first message to the session management network element through the access and mobility management network element, so that the session management network element determines, based on the first message, whether the QoS requirement of the first QoS flow can be satisfied, and adjusts/modifies the first QoS flow based on a status of the QoS requirement of the first QoS flow, so that an adjusted first QoS flow satisfies a transmission requirement of the service data flow of the application.

Further, because the user equipment has mobility, the user equipment may move from a coverage area of the first access network element to a coverage area of the second access network element. When the user equipment moves from the coverage area of the first access network element to the coverage area of the second access network element, a QoS flow used to transmit a service data flow of an application is switched, and whether a QoS requirement of the QoS flow used to transmit the service data flow of the application can be satisfied may change. Consequently, whether a QoS requirement of the service data flow of the application can be satisfied changes. For example: A QoS flow originally used to transmit a service data flow of an application is a QoS flow 1, a QoS requirement of the QoS flow 1 can be satisfied, and a QoS requirement of the service data flow of the application can be satisfied. However, when the user equipment moves to a coverage area of a new access network element, the QoS flow used to transmit the service data flow of the application is switched to a QoS flow 2, a QoS requirement of the QoS flow 2 cannot be satisfied, and a QoS requirement of the service data flow of the application cannot be satisfied. In this case, when a satisfaction status of the QoS requirement of the QoS flow changes and the QoS requirement of the service data flow of the application changes, if the application function network element is not notified of a status of the QoS requirement of the service data flow of the application in a timely manner, the application function network element incorrectly understands the status of the QoS requirement of the service data flow of the application, affecting transmission of the service data flow of the application.

To resolve the foregoing problems, in this embodiment of this application, when the user equipment moves from the coverage area of the first access network device to the coverage area of the second access network device, the second access network device may report the status of the QoS requirement of the service data flow of the application to the application function network element with reference to a status that is of the QoS requirement of the QoS flow and that is detected by the first access network device and a status that is of the QoS requirement of the QoS flow and that is detected by the second access network device. Specifically, the second access network device may send, to the application function network element through the user plane network element by using any one of the following methods shown in FIG. 5 to FIG. 9, second reporting information indicating whether the QoS requirement of the service data flow of the application can be satisfied.

It should be noted that before performing any one of the methods shown in FIG. 5 to FIG. 9, the first access network device performs the method shown in FIG. 3 or FIG. 4, and the first access network device stores whether the QoS requirement of the first QoS flow is satisfied.

Figure 5:
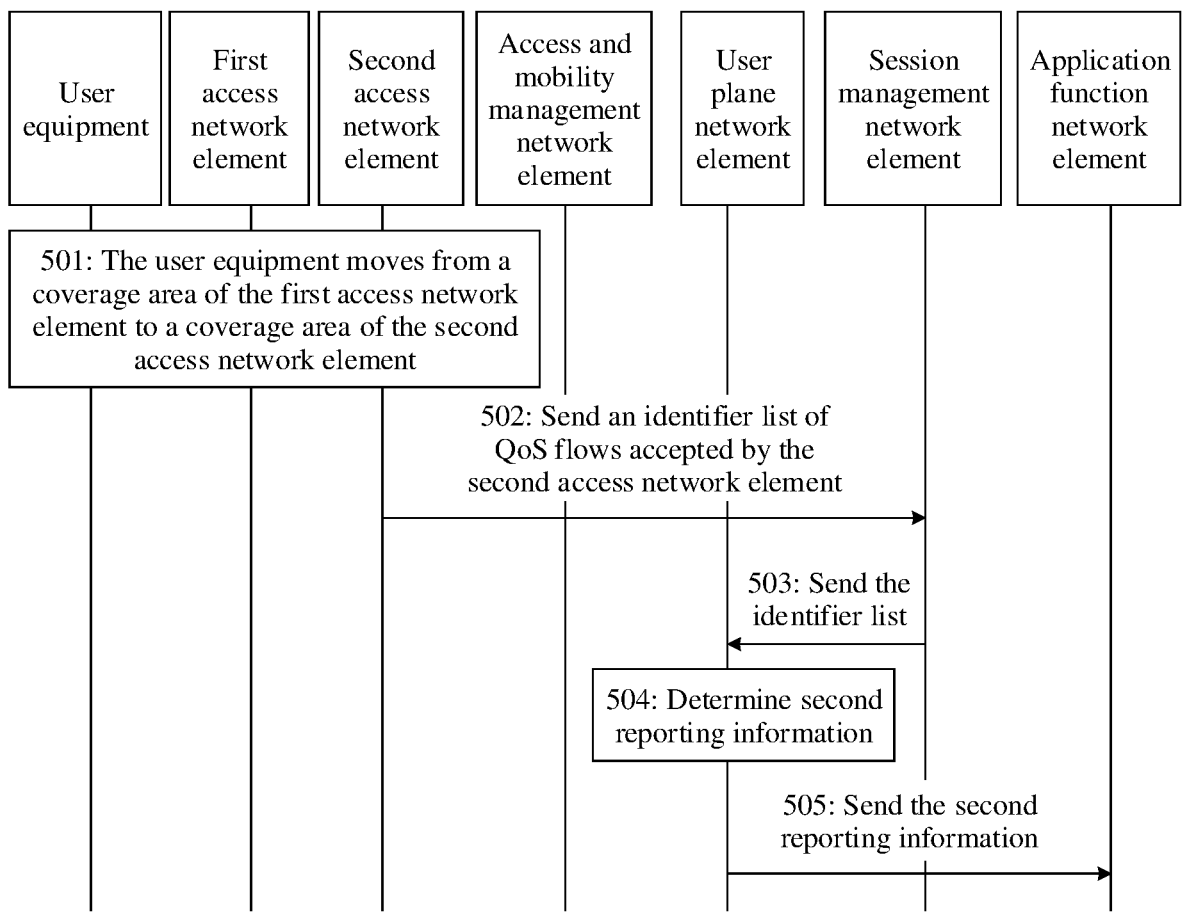
FIG. 5 is a schematic diagram of a reporting information sending method according to an embodiment of the present invention.

FIG. 5 shows a reporting information sending method according to an embodiment of this application. The method may include the following steps.

Step 501: User equipment moves from a coverage area of a first access network element to a coverage area of a second access network element.

After the user equipment moves, a network may perform access network element handover, for example, Xn-based inter NG-RAN handover or inter NG-RAN node N2-based handover (inter NG-RAN node N2 based handover).

Specifically, for an access network element handover process, refer to a conventional technology. Details are not described.

Step 502: The second access network element sends, to a session management network element through an access and mobility management network element, an identifier list of QoS flows accepted by the second access network element.

The identifier list of the QoS flows accepted by the second access network element includes an identifier of one or more QoS flows, and a QoS requirement of the QoS flow identified by the identifier of the QoS flow in the identifier list can be satisfied.

For example, the second access network device may detect whether the QoS requirement of the QoS flow can be satisfied, and include an identifier of a QoS flow that can be satisfied, as an identifier of a QoS flow accepted by the second access network element, in the identifier list of the QoS flows accepted by the second access network element. For a manner in which the second access network device detects whether the QoS requirement of the QoS flow can be satisfied, refer to step 301. Details are not described again.

Optionally, the identifier list may be carried in an N2 path switch request or a handover request acknowledge message, to reduce signaling interaction.

For specific descriptions of the N2 path switch request and the handover request acknowledge message, refer to the conventional technology. Details are not described.

Optionally, if the second access network device detects that a QoS requirement of an alternative QoS profile of the QoS flow can be satisfied, when sending the identifier of the QoS flow to the session management network element, the second access network element further includes an identifier of the corresponding alternative QoS profile.

Step 503: The session management network element receives the identifier list of the QoS flows accepted by the second access network element, and sends the identifier list of the QoS flows accepted by the second access network element to a user plane network element.

Optionally, the session management network element further sends the identifier of the alternative QoS profile corresponding to the QoS flow to the user plane network element.

Step 504: The user plane network element receives the identifier list of the QoS flows accepted by the second access network element, and determines second reporting information based on the identifier list of the QoS flows accepted by the second access network element.

Specifically, when the user plane network element sends, before the user equipment moves, first reporting information indicating that a QoS requirement of a service data flow of an application cannot be satisfied, and an identifier of a QoS flow corresponding to the service data flow of the application is in the received identifier list, the user plane network element sends the second reporting information to an application function network element, where the second reporting information includes third indication information, and the third indication information is used to indicate that the QoS requirement of the service data flow of the application can be satisfied.

For example, before the user equipment moves, the user plane network element sends second reporting information indicating that a QoS requirement of a service data flow of an application corresponding to a first QoS flow cannot be satisfied. After receiving the identifier list of the QoS flows accepted by the second access network element, the user plane network element detects whether an identifier of the first QoS flow is in the identifier list, and if yes, sends the second reporting information including third indication information to the application function network element, where the third indication information is used to indicate that the QoS requirement of the service data flow of the application can be satisfied, and the service data flow of the application corresponds to the first QoS flow. Optionally, the second reporting information further includes an identifier of a corresponding alternative service requirement.

Step 505: The user plane network element sends the second reporting information to the application function network element.

For step 505, refer to the descriptions in step 303. Details are not described again.

According to the method shown in FIG. 5, the second access network device may send the identifier list of the QoS flows acceptable by the second access network device to the session management network element, the session management network element sends the identifier list of the QoS flows acceptable by the second access network element to the user plane network element, and the user plane network element determines the second reporting information based on the identifier list of the QoS flows acceptable by the second access network element, and sends the second reporting information to the application function network element. In this way, when the user equipment moves, the updated QoS requirement of the service data flow of the application may be sent to the application function network element in a timely manner, so that the application function network element accurately learns of a status of the current QoS requirement of the service data flow, and sends the service data flow by using a corresponding adjustment measure based on the status of the current QoS requirement of the service data flow, to improve transmission quality of the service data flow.

FIG. 5 is described by using an example in which the second access network device sends the identifier list of the QoS flows acceptable by the second access network device to the user plane network element through the session management network element. Alternatively, the second access network device may directly send the identifier list of the QoS flows acceptable by the second access network device to the user plane network element. Specifically, for the process, refer to FIG. 7.

Figure 6:
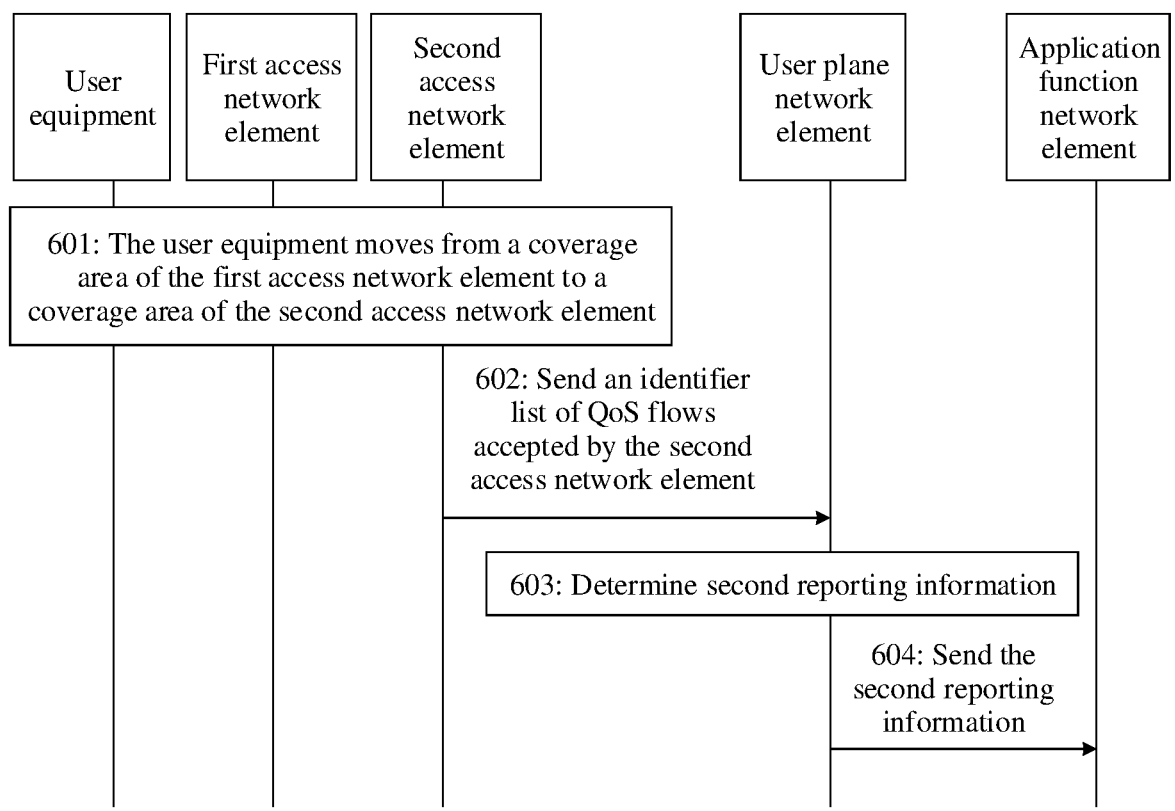
FIG. 6 is a schematic diagram of a reporting information sending method according to an embodiment of the present invention.

FIG. 6 shows a reporting information sending method according to an embodiment of this application. The method includes the following steps.

Step 601: User equipment moves from a coverage area of a first access network element to a coverage area of a second access network element.

Specifically, for step 601, refer to the descriptions in step 501. Details are not described again.

Step 602: The second access network element sends an identifier list of QoS flows accepted by the second access network element to a user plane network element.

Optionally, if the second access network device detects that a QoS requirement of an alternative QoS profile of the QoS flow can be satisfied, when sending the identifier of the QoS flow to a session management network element, the second access network element further includes an identifier of the corresponding alternative QoS profile.

For step 602, refer to the descriptions in step 502. Details are not described again.

Step 603: The user plane network element receives the identifier list of the QoS flows accepted by the second access network element, and determines second reporting information based on the identifier list of the QoS flows accepted by the second access network element.

Specifically, step 603 is consistent with step 504. Details are not described again.

Step 604: The user plane network element sends the second reporting information to an application function network element.

Optionally, the second reporting information further includes an identifier of a corresponding alternative service requirement.

For step 604, refer to the descriptions in step 303. Details are not described again.

According to the method shown in FIG. 6, the second access network device may send the identifier list of the QoS flows acceptable by the second access network device to the user plane network element, and the user plane network element determines the second reporting information based on the identifier list of the QoS flows acceptable by the second access network element, and sends the second reporting information to the application function network element. In this way, when the user equipment moves, an updated QoS requirement of a service data flow of an application may be sent to the application function network element in a timely manner, so that the application function network element accurately learns of a status of the current QoS requirement of the service data flow, and sends the service data flow by using a corresponding adjustment measure based on the status of the current QoS requirement of the service data flow, to improve transmission quality of the service data flow.

FIG. 5 and FIG. 6 are described by using an example in which the second access network device sends the identifier list of the QoS flows acceptable by the second access network device to the user plane network element, and the user plane network element determines the second reporting information based on the identifier list of the QoS flows acceptable by the second access network device. Alternatively, the second access network device may determine a QoS flow whose QoS requirement satisfaction status changes, and indicate the QoS requirement satisfaction status of the QoS flow to the user plane network element, and the user plane network element determines the second reporting information. Specifically, for the process, refer to FIG. 7.

Figure 7:
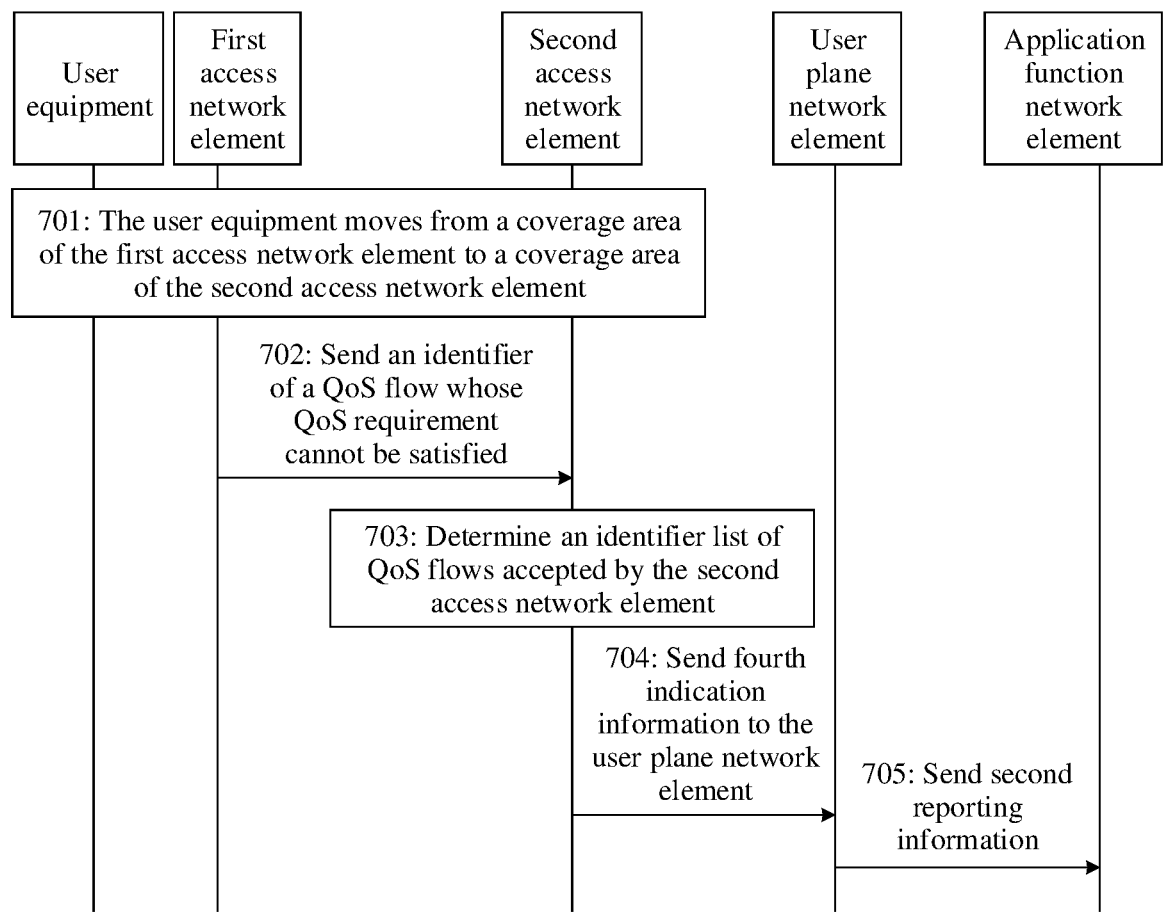
FIG. 7 is a schematic diagram of a reporting information sending method according to an embodiment of the present invention.

FIG. 7 shows a reporting information sending method according to an embodiment of this application. The method includes the following steps.

Step 701: User equipment moves from a coverage area of a first access network element to a coverage area of a second access network element.

Specifically, step 701 is consistent with step 501. Details are not described again.

Step 702: The first access network element sends, to the second access network element, an identifier of a QoS flow whose QoS requirement cannot be satisfied.

Optionally, the first access network element sends, to the second access network element, an identifier of an alternative QoS profile that is currently satisfied by the first access network element a current QoS profile of.

For example, the first access network device may detect, with reference to the manner shown in step 301, whether the QoS requirement of the QoS flow can be satisfied, and send, to the second access network element, the identifier of the QoS flow whose QoS requirement cannot be satisfied.

Step 703: The second access network element determines an identifier list of QoS flows accepted by the second access network element.

For related descriptions of the identifier list of the QoS flows accepted by the second access network element and step 703, refer to the descriptions in step 502. Details are not described again.

Step 704: The second access network element detects whether the identifier that is of the QoS flow and that is sent by the first access network element is in the identifier list of the QoS flows accepted by the second access network element, and if yes, sends fourth indication information to a user plane network element.

The fourth indication information may be used to indicate that the QoS requirement of the QoS flow can be satisfied.

Optionally, if the second access network device detects that a QoS requirement of an alternative QoS profile of the QoS flow can be satisfied, when sending the identifier of the QoS flow to a session management network element, the second access network element further includes an identifier of the corresponding alternative QoS profile.

Specifically, when the first access network element sends, before the user equipment moves, first reporting information indicating that a QoS requirement of a QoS flow cannot be satisfied, the first access network element sends an identifier of the QoS flow to the second access network element. When the second access network element detects that the identifier of the QoS flow is in the identifier list of the QoS flows accepted by the second access network element, the second access network element sends, to the user plane network element, fourth indication information used to indicate that the QoS requirement of the QoS flow can be satisfied.

For example, the first access network element sends, before the user equipment moves, first reporting information indicating that a QoS requirement of a first QoS flow cannot be satisfied, and sends an identifier of the first QoS flow to the second access network element. When detecting that the identifier of the first QoS flow is in the identifier list of the QoS flows accepted by the second access network element, the second access network element sends, to the user plane network element, fourth indication information used to indicate that the QoS requirement of the first QoS flow can be satisfied.

Step 705: The user plane network element receives the fourth indication information, and sends second reporting information to an application function network element based on the fourth indication information The second reporting information may include third indication information that is used to indicate that a QoS requirement of a service data flow of an application can be satisfied.

Specifically, if the user plane network element determines, based on the fourth indication information, that the QoS requirement of the first QoS flow can be satisfied, the user plane network element may generate, based on the fourth indication information, the third indication information indicating that the QoS requirement of the service data flow of the application can be satisfied, where the service data flow of the application corresponds to the first QoS flow.

According to the method shown in FIG. 7, the first access network element may send, to the second access network element, the identifier of the QoS flow whose QoS requirement cannot be satisfied. The second access network device may determine, based on the identifier list of the QoS flows acceptable by the second access network element and the identifier that is of the QoS flow whose QoS requirement cannot be satisfied and that is sent by the first access network device, the indication information indicating that the QoS requirement of the QoS flow can be satisfied, and send the indication information to the user plane network element, so that the user plane network element sends the second reporting information to the application function network element based on the indication information. In this way, when the user equipment moves, the updated QoS requirement of the service data flow of the application is sent to the application function network element in a timely manner, so that the application function network element accurately learns of a status of the current QoS requirement of the service data flow, and sends the service data flow by using a corresponding measure based on the status of the current QoS requirement of the service data flow, to improve transmission quality of the service data flow.

FIG. 5 and FIG. 6 are described by using an example in which the second access network device sends the identifier list of the QoS flows acceptable by the second access network device to the user plane network element, and the user plane network element determines the second reporting information based on the identifier list of the QoS flows acceptable by the second access network device. FIG. 7 is described by using an example in which the second access network device determines the QoS flow whose QoS requirement satisfaction status changes, and indicates the QoS requirement satisfaction status of the QoS flow to the user plane network element, and the user plane network element determines the second reporting information. Alternatively, the session management network element may determine the QoS flow whose QoS requirement satisfaction status changes, and indicate the QoS requirement satisfaction status of the QoS flow to the user plane network element, and the user plane network element determines the second reporting information. Specifically, for the process, refer to FIG. 8.

Figure 8:
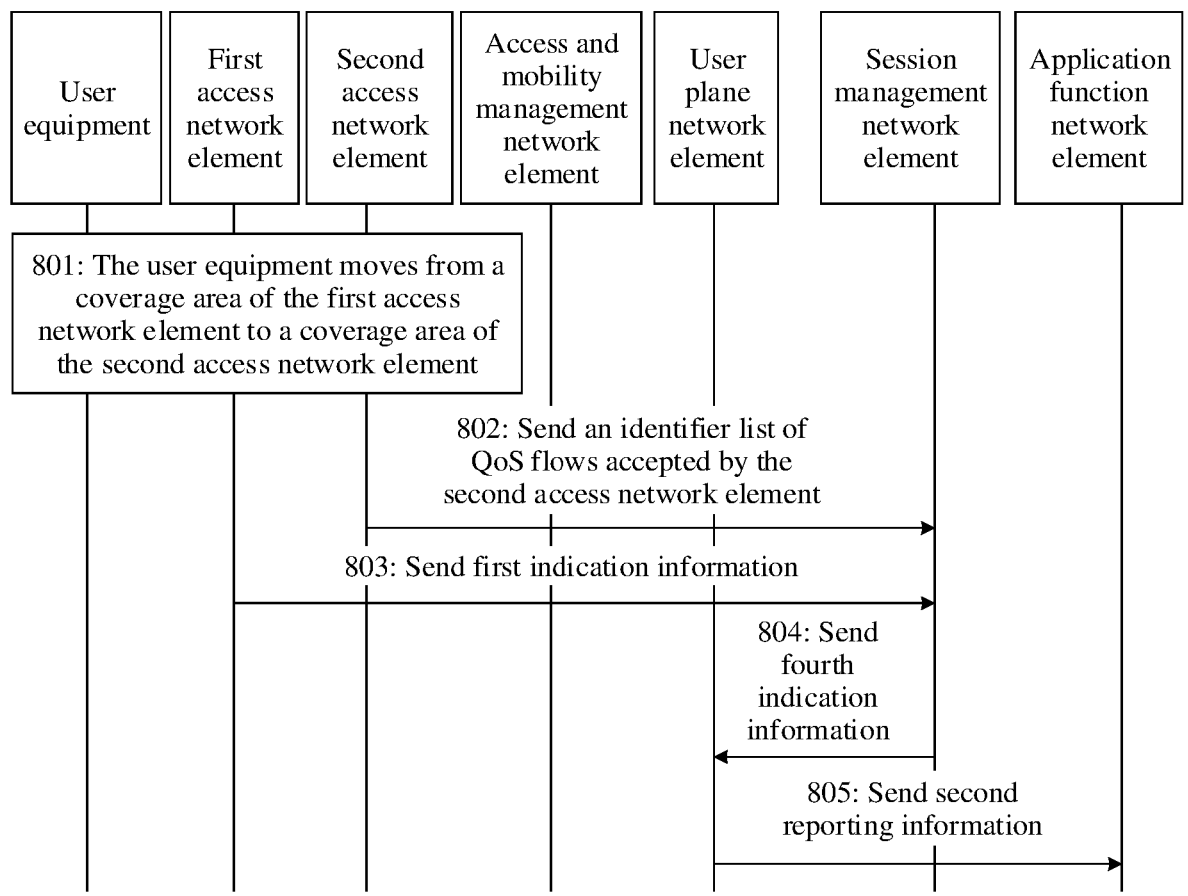
FIG. 8 is a schematic diagram of a reporting information sending method according to an embodiment of the present invention.

FIG. 8 shows a reporting information sending method according to an embodiment of this application. The method includes the following steps.

Step 801: User equipment moves from a coverage area of a first access network element to a coverage area of a second access network element.

Specifically, step 801 is consistent with step 501. Details are not described again.

Step 802: The second access network element sends an identifier list of QoS flows accepted by the second access network element to a session management network element.

Specifically, step 802 is consistent with step 502. Details are not described again.

Step 803: The first access network device sends, to the session management network element, first indication information indicating that a QoS requirement of a QoS flow cannot be satisfied.

Step 804: The session management network element receives the identifier list of the QoS flows accepted by the second access network element, determines fourth indication information based on an identifier of the QoS flow corresponding to the first indication information that is sent by the first access network element and that indicates that the QoS requirement of the QoS flow cannot be satisfied and the identifier list of the QoS flows accepted by the second access network element, and sends the fourth indication information to a user plane network element.

The fourth indication information is used to indicate that the QoS requirement of the QoS flow can be satisfied.

Specifically, the session management network element determines, based on the first indication information that is sent by the first access network element and that is used to indicate whether the QoS requirement of the QoS flow can be satisfied, the identifier of the QoS flow corresponding to the first indication information indicating that the QoS requirement of the QoS flow cannot be satisfied, detects whether the identifier of the QoS flow is in the identifier list of the QoS flows accepted by the second access network element, if yes, generates the fourth indication information used to indicate that the QoS requirement of the QoS flow can be satisfied, and sends the fourth indication information to the user plane network element.

For example, the session management network element determines an identifier of a first QoS flow based on first indication information that is sent by the first access network element and that is used to indicate that a QoS requirement of the first QoS flow cannot be satisfied, detects whether the identifier of the first QoS flow is in the identifier list of the QoS flows accepted by the second access network element, if yes, generates fourth indication information used to indicate that the QoS requirement of the first QoS flow can be satisfied, and sends the fourth indication information to the user plane network element.

Step 805: The user plane network element receives the fourth indication information, and sends second reporting information to an application function network element based on the fourth indication information Optionally, the second reporting information further includes an identifier of a corresponding alternative service requirement.

Specifically, step 805 is consistent with step 705. Details are not described again.

It should be noted that in the foregoing four methods, the user plane network element may send the second reporting information to the application function network element in the manner of sending the first reporting information to the application function network element in the method shown in FIG. 4.

According to the method shown in FIG. 8, the first access network element may send, to the session management network element, the identifier of the QoS flow whose QoS requirement cannot be satisfied. The session management network element may determine, based on the identifier list of the QoS flows acceptable by the second access network element and the identifier that is of the QoS flow whose QoS requirement cannot be satisfied and that is sent by the first access network device, the indication information indicating that the QoS requirement of the QoS flow can be satisfied, and send the indication information to the user plane network element, so that the user plane network element sends the second reporting information to the application function network element based on the indication information. In this way, when the user equipment moves, an updated QoS requirement of a service data flow of an application is sent to the application function network element in a timely manner, so that the application function network element accurately learns of a status of the current QoS requirement of the service data flow, and sends the service data flow by using a corresponding measure based on the status of the current QoS requirement of the service data flow, to improve transmission quality of the service data flow.

Figure 9:
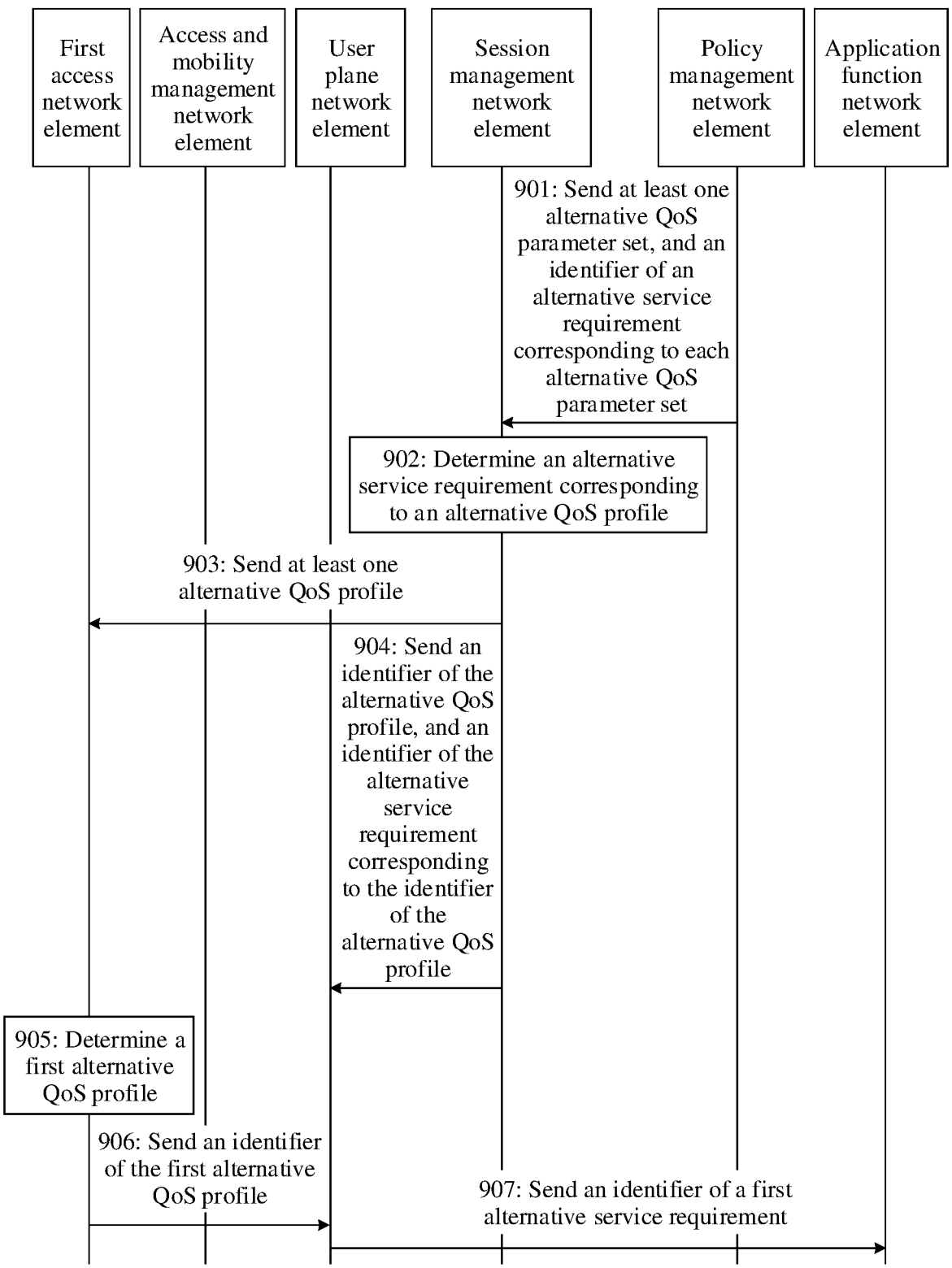
FIG. 9 is a schematic diagram of a reporting information sending method according to an embodiment of the present invention.

Further, when the application function network element sends at least one alternative service requirement corresponding to the application to a policy control network element, similar to the method shown in FIG. 3, the method shown in FIG. 9 may be used to send, to the application function network element, an identifier of an alternative service requirement that can satisfy the QoS requirement in the at least one alternative service requirement corresponding to the application. FIG. 9 shows a reporting information sending method according to an embodiment of this application. The method includes the following steps.

Step 901: A policy control network element determines, based on at least one alternative service requirement, an alternative QoS parameter set corresponding to each alternative service requirement, and sends the at least one alternative QoS parameter set and an identifier of the alternative service requirement corresponding to an identifier of each alternative QoS parameter set to a session management network element.

Optionally, the policy control network element includes, in a third policy, the at least one alternative QoS parameter set and the identifier of the alternative service requirement corresponding to the identifier of the alternative QoS parameter set, and sends the third policy to the session management network element.

Step 902: The session management network element determines, based on the at least one alternative QoS parameter set, an alternative QoS profile corresponding to each alternative QoS parameter set, and determines, based on the alternative service requirement corresponding to the alternative QoS parameter set, the alternative service requirement corresponding to the alternative QoS profile.

Step 903: The session management network element sends the at least one alternative QoS profile to a first access network element.

Step 904: The session management network element sends, to a user plane network element, an identifier of the alternative QoS profile and the identifier of the alternative service requirement corresponding to the identifier of the alternative QoS profile.

Step 905: The first access network element receives the at least one alternative QoS profile, and determines a first alternative QoS profile that can satisfy a QoS requirement.

The at least one alternative QoS profile includes the first alternative QoS profile.

Step 906: The first access network element sends an identifier of the first alternative QoS profile to the user plane network element.

Step 907: The user plane network element determines, based on the identifier of the first alternative QoS profile, an identifier of a first alternative service requirement corresponding to the identifier of the first alternative QoS profile, and sends the identifier of the first alternative service requirement to an application function network element.

Optionally, the user plane network element includes the identifier of the first alternative service requirement in first reporting information, and sends the first reporting information to the application function network element.

Further, according to the method in FIG. 9, when user equipment moves from a coverage area of the first access network element to a coverage area of a second access network element, the second access network element determines, based on the at least one alternative QoS profile sent by the session management network element, a second alternative QoS profile whose QoS requirement can be satisfied by the second access network element, and sends an identifier of the second alternative QoS profile to the user plane network element. The user plane network element determines an identifier of a second alternative service requirement based on the identifier of the second alternative QoS profile, and sends the identifier of the second alternative service requirement to the application function network element.

Optionally, the first access network element may send the identifier of the first alternative QoS profile to the second access network element. The second access network element determines, based on the at least one alternative QoS profile sent by the session management network element, the second alternative QoS profile whose QoS requirement can be satisfied by the second access network element. If the second alternative QoS profile is different from the first alternative QoS profile, the second access network element sends the identifier of the second alternative QoS profile to the user plane network element. The user plane network element determines the identifier of the second alternative service requirement based on the identifier of the second alternative QoS profile, and sends the identifier of the second alternative service requirement to the application function network element, to indicate that after the user equipment is handed over from the first access network element to the second access network element, an alternative service requirement that can be satisfied is changed from the first alternative service requirement to the second alternative service requirement.

If the second alternative QoS profile is the same as the first alternative QoS profile, it indicates that the alternative QoS profiles satisfied by the first access network element and the second access network element are the same, and the identifier of the first alternative service requirement may not need to be sent to the application function network element again, so as to reduce signaling interaction in a network.

The foregoing mainly describes the solutions provided in embodiments of this application from the perspective of interaction between the devices. It may be understood that to implement the foregoing functions, the devices include hardware structures and/or software modules corresponding to the functions. A person skilled in the art should be easily aware that the algorithm steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, various network elements may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, and is merely logical function division. In an actual implementation, another division manner may be used.

Figure 10:
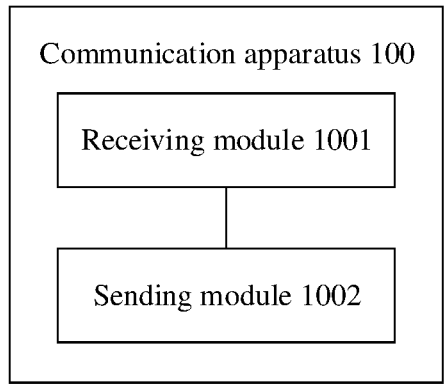
FIG. 10 is a schematic composition diagram of a communication apparatus according to an embodiment of the present invention.

When each functional module is obtained through division based on each corresponding function, FIG. 10 shows a communication apparatus. The communication apparatus 100 may be a user plane network element, or a chip or a system on chip in the user plane network element. The communication apparatus 100 may be configured to perform a function of the user plane network element in the foregoing embodiments. The communication apparatus 100 shown in FIG. 10 includes a receiving module 1001 and a sending module 1002.

The receiving module 1001 is configured to receive, from a first access network element, a first message including an identifier of a first quality of service flow QoS flow used to transmit a service data flow of an application and first indication information, where the first indication information is used to indicate whether a quality of service QoS requirement of the first QoS flow can be satisfied.

The sending module 1002 is configured to send, to an application function network element based on the first message, first reporting information including second indication information, where the second indication information is used to indicate whether a QoS requirement of the service data flow of the application can be satisfied.

For a specific implementation of the communication apparatus 100, refer to behavior functions of the user plane network element in the reporting information sending method in FIG. 3 to FIG. 9.

In a possible design, if the first indication information is used to indicate that the QoS requirement of the first QoS flow cannot be satisfied, the second indication information is used to indicate that the QoS requirement of the service data flow of the application cannot be satisfied; or if the first indication information is used to indicate that the QoS requirement of the first QoS flow is satisfied, the second indication information is used to indicate that the QoS requirement of the service data flow of the application is satisfied.

In a possible design, when the second indication information indicates that the QoS requirement of the service data flow of the application cannot be satisfied, after that the user plane network element sends first reporting information to an application function network element, the receiving module 1001 is further configured to receive, from a second access network element or a session management network element, an identifier list that is of QoS flows accepted by the second access network element and that includes the identifier of the first QoS flow; and the sending module 1002 is further configured to send, to the application function network element, second reporting information including third indication information, where the third indication information is used to indicate that the QoS requirement of the service data flow of the application can be satisfied.

In a possible design, when the second indication information indicates that the QoS requirement of the service data flow of the application cannot be satisfied, after that the user plane network element sends first reporting information to an application function network element, the receiving module 1001 is further configured to receive fourth indication information from a second access network element or a session management network element, where the fourth indication information is used to indicate that the QoS requirement of the first QoS flow can be satisfied; and the sending module 1002 is further configured to send second reporting information to the application function network element, where the second reporting information includes third indication information, and the third indication information is used to indicate that the QoS requirement of the service data flow of the application can be satisfied.

In a possible design, the receiving module 1001 is further configured to receive a first policy from the session management network element, where the first policy includes the identifier of the first QoS flow and information about a notification endpoint that is of the application function network element and that corresponds to the identifier of the first QoS flow; and the sending module 1002 is further configured to send the first reporting information to the application function network element through the notification endpoint of the application function network element according to the first policy.

In a possible design, the receiving module 1001 is further configured to receive a first policy from the session management network element, where the first policy includes the identifier of the first QoS flow and information about a notification endpoint that is of the application function network element and that corresponds to the identifier of the first QoS flow; and the sending module 1002 is further configured to send the second reporting information to the application function network element through the notification endpoint of the application function network element according to the first policy.

In a possible design, the receiving module 1001 is further configured to receive fifth indication information from the session management network element, where the fifth indication information is used to indicate the user plane network element to send the first reporting information to the application function network element; and that the sending module 1002 is further configured to send first reporting information to an application function network element includes: The user plane network element further sends the first reporting information to the application function network element based on the fifth indication information.

In a possible design, the receiving module 1001 is further configured to receive fifth indication information from the session management network element, where the fifth indication information is used to indicate the user plane network element to send the second reporting information to the application function network element; and that the sending module 1002 is further configured to send second reporting information to the application function network element includes: The user plane network element further sends the second reporting information to the application function network element based on the fifth indication information.

In a possible design, the sending module 1002 is further configured to send the first reporting information to the application function network element through a local network exposure network element.

In a possible design, the sending module 1002 is further configured to send the second reporting information to the application function network element through a local network exposure network element.

In a possible design, the receiving module 1001 is further configured to receive a second policy from the session management network element, where the second policy includes the identifier of the first QoS flow and information about a notification endpoint that is of the local network exposure network element and that corresponds to the identifier of the first QoS flow; the sending module 1002 is further configured to send, according to the second policy, the first reporting information to the local network exposure network element through the notification endpoint of the local network exposure network element; the local network exposure network element determines the notification endpoint of the application function network element based on the notification endpoint of the local network exposure network element; and the local network exposure network element sends the first reporting information to the application function network element by using the information about the notification endpoint of the application function network element.

In a possible design, the receiving module 1001 is further configured to receive a second policy from the session management network element, where the second policy includes the identifier of the first QoS flow and information about a notification endpoint that is of the local network exposure network element and that corresponds to the identifier of the first QoS flow; the sending module 1002 is further configured to send, according to the second policy, the second reporting information to the local network exposure network element through the notification endpoint of the local network exposure network element; the local network exposure network element determines the notification endpoint of the application function network element based on the notification endpoint of the local network exposure network element; and the local network exposure network element sends the second reporting information to the application function network element by using the information about the notification endpoint of the application function network element.

In a possible design, the first reporting information further includes an identifier of the service data flow of the application.

In a possible design, the second reporting information further includes an identifier of the service data flow of the application.

In a possible design, the receiving module 1001 is further configured to receive, from the session management network element, the identifier of the first QoS flow and the identifier that is of the service data flow of the application and that corresponds to the identifier of the first QoS flow; and the user plane network element determines the identifier of the service data flow of the application based on the identifier of the first QoS flow.

In a possible design, the first message further includes an identifier of a first alternative QoS profile, the first reporting information further includes an identifier of a first alternative service requirement, and the identifier of the first alternative service requirement corresponds to the identifier of the first alternative QoS profile.

In a possible design, the receiving module 1001 is further configured to receive an identifier of an alternative service requirement and an identifier of an alternative QoS profile corresponding to the identifier of the alternative service requirement from the session management network element; and the user plane network element determines the identifier of the first alternative service requirement based on the identifier of the first alternative QoS profile.

In another possible implementation, the receiving module 1001 and the sending module 1002 in FIG. 10 may be replaced with a transceiver, and functions of the receiving module 1001 and the sending module 1002 may be integrated into the transceiver. Optionally, the communication apparatus 100 shown in FIG. 10 may further include a memory. When the receiving module 1001 and the sending module 1002 are replaced with the transceiver, the communication apparatus 100 in this embodiment of this application may be the communication apparatus shown in FIG. 2.

Figure 11:
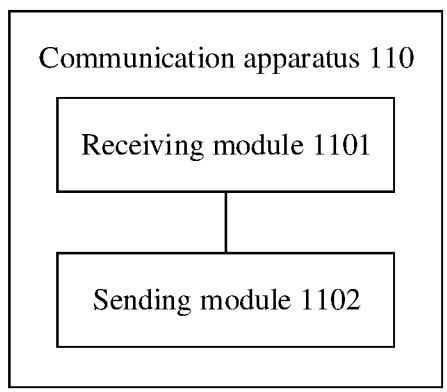
FIG. 11 is a schematic composition diagram of a communication apparatus according to an embodiment of the present invention.

When each functional module is obtained through division based on each corresponding function, FIG. 11 shows a communication apparatus. The communication apparatus no may be an access network element, or a chip or a system on chip in the access network element. The communication apparatus 110 may be configured to perform a function of the access network element in the foregoing embodiments. The communication apparatus 110 shown in FIG. 11 includes a receiving module 1101 and a sending module 1102.

The receiving module 1101 is configured to receive QoS notification control indication information of a first quality of service flow QoS flow from a session management network element, where the QoS notification control indication information is used to indicate to send a notification indicating whether a QoS requirement of a QoS flow can be satisfied.

The sending module 1102 is configured to send, to a user plane network element based on the QoS notification control indication information, a first message including an identifier of the first QoS flow and first indication information, where the first indication information is used to indicate whether the quality of service QoS requirement of the first QoS flow can be satisfied.

For a specific implementation of the communication apparatus 110, refer to behavior functions of the access network element in the reporting information sending method in FIG. 3 to FIG. 9.

In a possible design, when a first access network element determines that the QoS requirement of the first QoS flow cannot be satisfied, the first indication information is used to indicate that the QoS requirement of the first QoS flow cannot be satisfied; or when the first access network element determines that the QoS requirement of the first QoS flow can be satisfied, the first indication information is used to indicate that the QoS requirement of the first QoS flow can be satisfied.

In a possible design, the receiving module 1101 is further configured to receive, from the session management network element, sixth indication information that is used to indicate the first access network element to send the identifier of the first QoS flow and the first indication information to the user plane network element by using the first message.

In a possible design, the sending module 1102 is further configured to: when user equipment moves from the first access network element to a second access network element, the first access network element sends the identifier of the first QoS flow to the second access network element.

In a possible design, the receiving module 1101 is further configured to receive at least one alternative QoS profile from the session management network element; and the sending module 1102 is further configured to send, to the user plane network element, an identifier of a first alternative QoS profile that is in the at least one alternative QoS profile and that can satisfy a QoS requirement corresponding to the first alternative QoS profile.

In a possible design, the sending module 1102 is further configured to send the identifier of the first alternative QoS profile to the second access network element.

In a possible design, the receiving module 1101 is further configured to receive, from the first access network element, an identifier that is of a QoS flow whose QoS requirement cannot be satisfied and that is notified by the first access network element to the user plane network element; and the sending module 1102 is further configured to send, to the user plane network element based on the identifier of the first QoS flow, fourth indication information used to indicate that the QoS requirement of the first QoS flow can be satisfied.

In a possible design, the receiving module 1101 is further configured to receive at least one alternative QoS profile from the first access network element or the session management network element; the receiving module 1101 is further configured to receive an identifier of a first alternative QoS profile from the first access network element, where the identifier of the first alternative QoS profile is an identifier corresponding to an alternative QoS profile that is sent by the first access network element to the user plane network element and whose QoS requirement can be satisfied by the first access network element; and the sending module 1102 is further configured to send, to the user plane network element based on the at least one alternative QoS profile and the first alternative QoS profile, an identifier of a second alternative QoS profile whose QoS requirement can be satisfied by the second access network element.

In another possible implementation, the receiving module 1101 and the sending module 1102 in FIG. 11 may be replaced with a transceiver, and functions of the receiving module 1101 and the sending module 1102 may be integrated into the transceiver. Further, the communication apparatus no shown in FIG. 11 may further include a memory. When the receiving module 1101 and the sending module 1102 are replaced with the transceiver, the communication apparatus no in this embodiment of this application may be the communication apparatus shown in FIG. 2.

Figure 12:
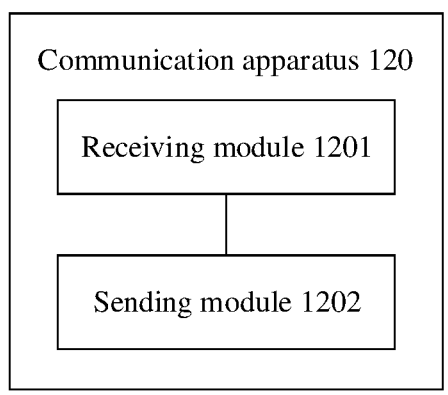
FIG. 12 is a schematic composition diagram of a communication apparatus according to an embodiment of the present invention.

FIG. 12 is a diagram of a structure of a communication apparatus 120. The communication apparatus 120 may be a session management network element, or a chip or a system on chip in the session management network element. The communication apparatus 120 may be configured to perform a function of the session management network element in the foregoing embodiments. The communication apparatus 120 shown in FIG. 12 includes a receiving module 1201 and a sending module 1202.

The receiving module 1201 is configured to receive, from a policy control network element, a third policy including quality of service QoS notification control indication information and information about a notification endpoint, where the QoS notification control indication information is used to indicate to send a notification indicating whether a QoS requirement of a QoS flow can be satisfied, and the notification endpoint is a notification endpoint that receives the notification indicating whether the QoS requirement can be satisfied.

The sending module 1202 is configured to send, to a first access network element, an identifier of a first quality of service flow QoS flow and QoS notification control indication information that are determined according to the third policy; and the session management network element sends, to a user plane network element, a first policy including the identifier of the first QoS flow and information about the notification endpoint.

For a specific implementation of the communication apparatus 120, refer to behavior functions of the session management network element in the reporting information sending method in FIG. 4 to FIG. 9.

In a possible design, the sending module 1202 is further configured to send, to the first access network element, sixth indication information used to indicate the access network element to send, to the user plane network element by using the first message, the notification indicating whether the QoS requirement can be satisfied.

In a possible design, the third policy includes at least one alternative QoS parameter set and an identifier of an alternative service requirement corresponding to an identifier of each alternative QoS parameter set; the communication apparatus further includes a processing module, where the processing module is configured to determine at least one alternative QoS profile based on the at least one alternative QoS parameter set; and the first policy further includes an identifier of the at least one alternative QoS profile and the identifier of the alternative service requirement corresponding to the identifier of the at least one alternative QoS profile.

In a possible design, the receiving module 1201 is further configured to receive, from the first access network element, the identifier of the first quality of service flow QoS flow and first indication information used to indicate that a QoS requirement of the first QoS flow cannot be satisfied; the receiving module 1201 is further configured to receive, from a second access network element, an identifier list of QoS flows accepted by the second access network element, where the identifier list includes the identifier of the first QoS flow; and the sending module 1202 is further used by the session management network element to send, to the user plane network element, fourth indication information used to indicate that the QoS requirement of the first QoS flow can be satisfied.

In a possible design, the receiving module 1201 is further configured to receive, from the second access network element, the identifier list of the QoS flows accepted by the second access network element; and the sending module 1202 is further configured to send the identifier list to the user plane network element.

In another possible implementation, the receiving module 1201 and the sending module 1202 in FIG. 12 may be replaced with a transceiver, and functions of the receiving module 1201 and the sending module 1202 may be integrated into the transceiver. Further, the communication apparatus 120 shown in FIG. 12 may further include a memory. When the receiving module 1201 and the sending module 1202 are replaced with the transceiver, the communication apparatus 120 in this embodiment of this application may be the communication apparatus shown in FIG. 2.

Figure 13:
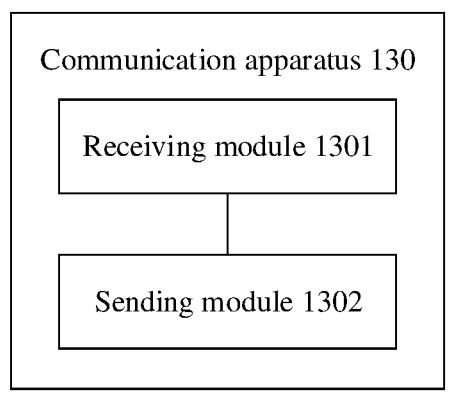
FIG. 13 is a schematic composition diagram of a communication apparatus according to an embodiment of the present invention.

FIG. 13 shows a communication apparatus. The communication apparatus 130 may be a policy management network element, or a chip or a system on chip in the policy management network element. The communication apparatus 130 may be configured to perform a function of the policy management network element in the foregoing embodiments. The communication apparatus 130 shown in FIG. 13 includes a receiving module 1301 and a sending module 1302.

The receiving module 1301 is configured to receive a service request including QoS notification control indication information and information about a notification endpoint, where the QoS notification control indication information is used to indicate to send a notification indicating whether a quality of service QoS requirement of a QoS flow can be satisfied, and the notification endpoint is a notification endpoint that receives the notification indicating whether the QoS requirement can be satisfied.

The sending module 1302 is configured to send, to a session management network element, a third policy that includes the QoS notification control indication information and the information about the notification endpoint and that corresponds to the service request.

For a specific implementation of the communication apparatus 130, refer to behavior functions of the policy control network element in the reporting information sending method in FIG. 4 to FIG. 9.

In a possible design, the receiving module 1301 is further configured to receive seventh indication information used to indicate the policy control network element to send the information about the notification endpoint to the session management network element.

In a possible design, the service request further includes eighth indication information used to indicate to send, through an optimized path, the notification indicating whether the QoS requirement can be satisfied.

In another possible implementation, the receiving module 1301 and the sending module 1302 in FIG. 13 may be replaced with a transceiver, and functions of the receiving module 1301 and the sending module 1302 may be integrated into the transceiver. Further, the communication apparatus 130 shown in FIG. 13 may further include a memory. When the receiving module 1301 and the sending module 1302 are replaced with the transceiver, the communication apparatus 130 in this embodiment of this application may be the communication apparatus shown in FIG. 2.

An embodiment of this application further provides a computer-readable storage medium. All or some of the procedures in the foregoing method embodiments may be completed by a computer program instructing related hardware. The program may be stored in the foregoing computer-readable storage medium. When the program is executed, the procedures of the foregoing method embodiments may be performed. The computer-readable storage medium may be an internal storage unit of the terminal (including a data transmit end and/or a data receive end) in any one of the foregoing embodiments, for example, a hard disk drive or a memory of the terminal. Alternatively, the computer-readable storage medium may be an external storage device of the terminal, for example, a plug-in hard disk, a smart media card (SMC), a secure digital (SD) card, a flash card, or the like that are configured on the terminal. Further, the computer-readable storage medium may alternatively include both the internal storage unit of the terminal and the external storage device. The computer-readable storage medium is configured to store the computer program and other programs and data that are required by the terminal. The computer-readable storage medium may be further configured to temporarily store data that has been output or is to be output.

It should be noted that, in the specification, claims, and accompanying drawings of this application, terms "first", "second", and the like are intended to distinguish between different objects but do not indicate a particular order. In addition, the terms "including", "having", and any other variant thereof are intended to cover a non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

It should be understood that in this application, "at least one (item)" means one or more, "a plurality of" means two or more, and "at least two (items)" means two, three, or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally represents an "or" relationship between the associated objects. "At least one of the following items (pieces)" or a similar expression thereof indicates any combination of these items, including a single item (piece) or any combination of a plurality of items (pieces). For example, at least one of a, b, and c may indicate a, b, c, "a and b", "a and c", "b and c", or "a, b, and c", where a, b, and c may be singular or plural.

The foregoing descriptions about the implementations allow a person skilled in the art to clearly understand that, for the purpose of convenient and brief description, division into only the foregoing functional modules is used as an example for description. During actual application, the foregoing functions can be allocated to different functional modules for implementation as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions in embodiments.

In addition, function units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
receiving, by a user plane network element, a first message from a first access network element, wherein the first message comprises an identifier of a first quality of service (QOS) flow and first indication information, and the first indication information indicates whether a QoS requirement of the first QoS flow is satisfiable by the first access network element, the first QoS flow being for transmitting a service data flow of an application; and
sending, by the user plane network element based on the first message, first reporting information to an application function network element corresponding to the application, wherein the first reporting information comprises second indication information indicating whether a QoS requirement of the service data flow of the application is satisfiable.

2. The method according to claim 1, wherein when the second indication information indicates that the QoS requirement of the service data flow of the application is not satisfiable, after sending, by the user plane network element, the first reporting information to the application function network element, the method further comprises:

receiving, by the user plane network element from a second access network element or a session management network element, an identifier list of QoS flows accepted by the second access network element, wherein the identifier list of QoS flows comprises the identifier of the first QoS flow; and sending, by the user plane network element, second reporting information to the application function network element, wherein the second reporting information comprises third indication information indicating that the QoS requirement of the service data flow of the application is satisfiable.

3. The method according to claim 1, wherein when the second indication information indicates that the QoS requirement of the service data flow of the application is not satisfiable, after sending, by the user plane network element, the first reporting information to the application function network element, the method further comprises:

receiving, by the user plane network element, fourth indication information from a second access network element or a session management network element indicating that the QoS requirement of the first QoS flow is satisfiable; and sending, by the user plane network element, second reporting information to the application function network element, wherein the second reporting information comprises third indication information indicating that the QoS requirement of the service data flow of the application is satisfiable.

4. The method according to claim 1, further comprising:

receiving, by the user plane network element, a first policy from a session management network element, wherein the first policy comprises the identifier of the first QoS flow and information about a notification endpoint that is of the application function network element and that corresponds to the identifier of the first QoS flow; and wherein sending, by the user plane network element, the first reporting information to the application function network element comprises: sending, by the user plane network element, the first reporting information to the application function network element through the notification endpoint of the application function network element according to the first policy.

5. The method according to claim 1, wherein before sending, by the user plane network element, the first reporting information to the application function network element, the method further comprises:

receiving, by the user plane network element, fifth indication information from a session management network element, wherein the fifth indication information indicates the user plane network element to send the first reporting information to the application function network element; and wherein sending, by the user plane network element, the first reporting information to the application function network element comprises: sending, by the user plane network element, the first reporting information to the application function network element based on the fifth indication information.

6. The method according to claim 1, wherein sending, by the user plane network element, the first reporting information to the application function network element comprises:

sending, by the user plane network element, the first reporting information to the application function network element through a local network exposure network element.

7. The method according to claim 6, further comprising:

receiving, by the user plane network element, a second policy from a session management network element, wherein the second policy comprises the identifier of the first QoS flow and information about a notification endpoint that is of the local network exposure network element and that corresponds to the identifier of the first QoS flow;

wherein sending, by the user plane network element, the first reporting information to the application function network element through the local network exposure network element comprises:

sending, by the user plane network element according to the second policy, the first reporting information to the local network exposure network element through the notification endpoint of the local network exposure network element;

determining, by the local network exposure network element, a notification endpoint of the application function network element based on the notification endpoint of the local network exposure network element; and sending, by the local network exposure network element, the first reporting information to the application function network element using information about the notification endpoint of the application function network element.

8. The method according to claim 1, wherein the first reporting information further comprises an identifier of the service data flow of the application.

9. The method according to claim 8, further comprising:

receiving, by the user plane network element from a session management network element, the identifier of the first QoS flow and an identifier that is of the service data flow of the application and that corresponds to the identifier of the first QoS flow; and determining, by the user plane network element, the identifier of the service data flow of the application based on the identifier of the first QoS flow.

10. The method according to claim 1, wherein the first message further comprises an identifier of a first alternative QoS profile, the first reporting information further comprises an identifier of a first alternative service requirement, and the identifier of the first alternative service requirement corresponds to the identifier of the first alternative QoS profile.

11. The method according to claim 10, further comprising:

receiving, by the user plane network element from a session management network element, a correspondence between an identifier of an alternative service requirement and an identifier of an alternative QoS profile; and determining, by the user plane network element, the identifier of the first alternative service requirement based on the identifier of the first alternative QoS profile and the correspondence.

12. A method comprising:

receiving, by a first access network element, QoS notification control indication information of a first quality of service (QOS) flow from a session management network element, wherein the QoS notification control indication information indicates the first access network element to send a notification indicating whether a QoS requirement of a QoS flow is satisfiable by the first access network element; and sending, by the first access network element, a first message to a user plane network element based on the QoS notification control indication information, wherein the first message comprises an identifier of the first QoS flow and first indication information, and the first indication information indicates whether a QoS requirement of the first QoS flow is satisfiable by the first access network element.

13. The method according to claim 12, wherein
when the first access network element determines that the QoS requirement of the first QoS flow is not satisfiable by the first access network element, the first indication information indicates that the QoS requirement of the first QoS flow is not satisfiable; or when the first access network element determines that the QoS requirement of the first QoS flow is satisfiable by the first access network element, the first indication information indicates that the QoS requirement of the first QoS flow is satisfiable.

14. The method according to claim 12, further comprising:
receiving, by the first access network element, sixth indication information from the session management network element, wherein the sixth indication information indicates the first access network element to send the identifier of the first QoS flow and the first indication information to the user plane network element using the first message.

15. The method according to claim 12, wherein when the first indication information indicates that the QoS requirement of the first QoS flow is not satisfiable, the method further comprises:
when a user equipment moves from a coverage area of the first access network element to a coverage area of a second access network element, sending, by the first access network element, the identifier of the first QoS flow to the second access network element.

16. The method according to claim 12, further comprising:
receiving, by the first access network element, at least one alternative QoS profile from the session management network element; and
sending, by the first access network element, an identifier of a first alternative QoS profile in the at least one alternative QoS profile to the user plane network element, wherein the first access network element satisfies a QoS requirement corresponding to the first alternative QoS profile.

17. The method according to claim 16, further comprising:
sending, by the first access network element, the identifier of the first alternative Qos profile to a second access network element.

18. A method comprising:
receiving, by a second access network element, an identifier of a first quality of service (QoS) flow from a first access network element, the first QoS flow having a QoS requirement that is unsatisfiable by the first access network element and that is notified by the first access network element to a user plane network element; and
sending, by the second access network element, fourth indication information to the user plane network element based on the identifier of the first QoS flow, wherein the fourth indication information indicates that the QoS requirement of the first QoS flow is not satisfiable.

19. The method according to claim 18, further comprising:
receiving, by the second access network element, at least one alternative QoS profile from the first access network element or a session management network element;
receiving, by the second access network element, an identifier of a first alternative QoS profile from the first access network element, the first alternative QoS profile having been sent by the first access network element to the user plane network element and having a Qos requirement that is satisfiable by the first access network element; and
sending, by the second access network element, an identifier of a second alternative QoS profile to the user plane network element based on the at least one alternative QoS profile and the first alternative QoS profile, the second alternative QoS profile having a QoS requirement satisfiable by the second access network element.

* * * * *